(12) United States Patent
Huang et al.

(10) Patent No.: US 11,024,094 B2
(45) Date of Patent: Jun. 1, 2021

(54) METHODS AND APPARATUS TO MAP A VIRTUAL ENVIRONMENT TO A PHYSICAL ENVIRONMENT

(71) Applicant: Intel Corporation, Santa Clara, CA (US)

(72) Inventors: Chao Huang, Shanghai (CN); Zhen Zhou, Shanghai (CN); Manuj Sabharwal, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/650,298

(22) PCT Filed: Dec. 21, 2017

(86) PCT No.: PCT/CN2017/117712
§ 371 (c)(1),
(2) Date: Mar. 24, 2020

(87) PCT Pub. No.: WO2019/119345
PCT Pub. Date: Jun. 27, 2019

(65) Prior Publication Data
US 2020/0312031 A1 Oct. 1, 2020

(51) Int. Cl.
*G06T 19/00* (2011.01)
*G06F 3/01* (2006.01)
(52) U.S. Cl.
CPC .......... *G06T 19/006* (2013.01); *G06F 3/011* (2013.01)
(58) Field of Classification Search
None
See application file for complete search history.

(56) References Cited

U.S. PATENT DOCUMENTS

2015/0062120 A1 3/2015 Reisner-Kollmann et al.
2016/0210784 A1 7/2016 Ramsby et al.
(Continued)

FOREIGN PATENT DOCUMENTS

CN 107111340 8/2017

OTHER PUBLICATIONS

Sun, Qi, Li-Yi Wei, and Arie Kaufman. "Mapping virtual and physical reality." ACM Transactions on Graphics (TOG) 35.4 (2016): 1-12. (Year: 2016).*
(Continued)

*Primary Examiner* — Vu Nguyen
(74) *Attorney, Agent, or Firm* — Hanley, Flight & Zimmerman, LLC

(57) ABSTRACT

Methods, apparatus, systems and articles of manufacture are disclosed to map a virtual environment to a physical environment using a weighted linear mapping technique. Example methods disclosed herein include accessing dimensional data corresponding to the virtual environment. Disclosed example methods further include determining areas of relative importance in the virtual environment. Disclosed example methods also include accessing dimensional data corresponding to the physical environment and generating a mapped environment based on the dimensional data corresponding to the virtual environment, the dimensional data corresponding to the physical environment, and the areas of relative importance.

20 Claims, 12 Drawing Sheets

(56) References Cited

U.S. PATENT DOCUMENTS

2017/0358120 A1 12/2017 Ambrus et al.
2019/0102934 A1* 4/2019 Neulander ......... G02B 27/0172

OTHER PUBLICATIONS

International Searching Authority, "International Search Report," issued in connection with International Patent Application No. PCT/CN2017/117712, dated Aug. 29, 2018, 4 pages.
International Searching Authority, "Written Opinion," issued in connection with International Patent Application No. PCT/CN2017/117712, dated Aug. 29, 2018, 4 pages.

* cited by examiner

METHODS AND APPARATUS TO MAP A VIRTUAL ENVIRONMENT TO A PHYSICAL ENVIRONMENT

This patent arises from a U.S. National Stage of International Patent Application Serial No. PCT/CN2017/117712. International Patent Application Serial No. PCT/CN2017/117712 is hereby incorporated by reference in its entirety. Priority to International Patent Application Serial No. PCT/CN2017/117712 is hereby claimed.

FIELD OF THE DISCLOSURE

This disclosure relates generally to virtual reality simulation, and, more particularly, to mapping a virtual environment to a physical environment.

BACKGROUND

In recent years, virtual reality has become increasingly popular, especially in the entertainment industry. Virtual reality enables the depiction of a virtual environment that has interactive elements in the physical environment. Virtual reality implementations often use a combination of visual and tactile stimuli, implemented via devices such as headsets, controllers and various feedback devices. For a virtual reality device to depict an interactive virtual environment in a user's physical space, a virtual reality device is configured so a user's movement in the physical environment results in a corresponding movement in the virtual environment.

BRIEF DESCRIPTION OF THE DRAWINGS

Wherever possible, the same reference numbers will be used throughout the drawing(s) and accompanying written description to refer to the same or like parts. The figures are not to scale.

DETAILED DESCRIPTION

Figure 1A:
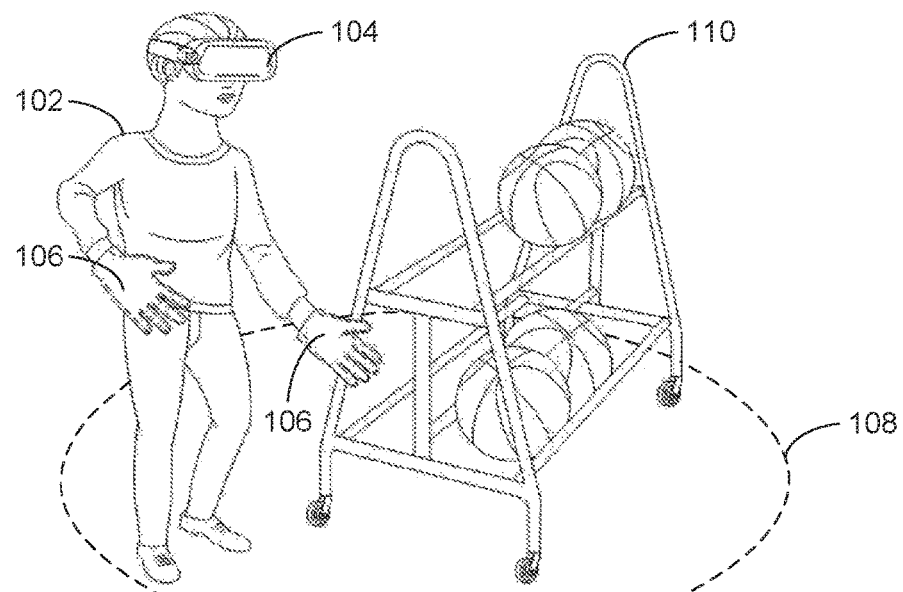
FIGS. 1A, 1B, and 1C are illustrations of an example environment of use in which a user interacts with a virtual environment and a corresponding physical environment.

As virtual reality (VR) becomes increasingly popular, a demand for seamless, streamlined VR environments has precipitated. VR systems simulate a VR environment using audio and/or video media. Typically, media including audio and video is accessed via the Internet or through locally stored VR data on a VR device. The VR environment (e.g., an environment that is created by the audio and video media) can be displayed in any number of ways such as, for example, via a computer monitor, a head-mounted device, speakers, sensors, interactive implements, etc. Additionally, sensors can be used in a VR implementation to monitor the physical environment and any user movement or interactions (e.g., grasping an object, throwing an object, walking, running, etc.). For example, some implementations may use an image sensor to track body movements and to obtain visual data of the dimensions and characteristics of the physical environment. Additionally or alternatively, wearable sensors may be mounted to, worn by, and/or carried on one or more body parts to detect motion of part of a user's body. Most VR implementations attempt to create an immersive, interactive experience that feels as close to reality as possible. For example, users expect that a movement in physical space results in a corresponding and natural movement in the virtual environment. As such, methods to implement a virtual environment that corresponds to a user's physical environment in a way that appears and feels natural are necessary.

Conventionally, VR implementations use either a teleport solution, an infinite solution, or a direct walk solution to relate the virtual environment to the physical environment. The teleport solution involves moving the user in the virtual environment without a similar corresponding movement (e.g., walking) in the physical environment. For example, the user may indicate using a controller, a voice command, a body motion, or some other indication that they would like to be transported to a different location in the virtual environment. In other examples, a user may walk in a certain direction or to a certain near-term destination and be transported to a different location in the virtual environment. While this solution allows the user to move around the virtual environment, it fails to resemble reality.

The infinite solution for representing virtual environments in physical environments involves a movable platform for the user to stand upon which is responsive to the push of a user's step to move the platform. This solution enables the space to be mapped at a 1:1 ratio, wherein a step in the physical environment corresponds to an equivalent motion in the virtual environment. However, this implementation requires extensive equipment, which inherently makes its use feel artificial and limits its scope. Further, motion sickness and a feeling of unnatural movement are often experienced by users in a VR implementation using the infinite solution.

In some more realistic implementations, the direct walk approach may be implemented to map the virtual environment to the physical environment. In such an approach, the user's motion is directly tracked as they walk around the physical space to move them correspondingly in the virtual environment. To implement a direct walk solution, some conventional implementations use redirected walking. In some implementations of this approach, the virtual environment is rotated around the user as they move, so that the user slightly rotates their body in the physical environment to move straight in the virtual environment. In a large physical environment, a user can continually walk straight in the virtual environment but actually move in a curved path in the physical environment to avoid collision with the boundaries of the physical environment. However, this implementation may result in motion sickness and additionally is noticeably unrealistic when making sudden motions.

Example methods, apparatus, systems and articles of manufacture disclosed herein utilize importance-weighted linear mapping to map virtual environments to physical environments. For example, these techniques may be utilized in a VR headset that receives sensor information about the physical space surrounding the headset and maps a virtual environment to the physical environment to be used during gameplay. In additional or alternative examples, the techniques disclosed herein may be implemented by a computer, console, or other device capable of connecting to and/or including a virtual reality device. Examples disclosed herein enable weighted mapping wherein areas of the virtual environment can be variably mapped to represent different sized areas in the physical environment. For example, an area of the virtual environment that includes interactive aspects may be given a different weight than an area of the virtual environment with no interactive aspects when determining the amount of space that is to correspond to these areas in the physical environment.

In contrast with conventional approaches to addressing movement in virtual environments, example virtual reality devices that map virtual environments to physical environment using an importance-weighted linear approach in accordance with the teachings of this disclosure enable a realistic user experience by providing non-uniform mapping of a virtual environment to a physical environment to more efficiently utilize the physical environment for interactive areas.

Although examples disclosed herein may be discussed in the context of VR implementations for entertainment applications, examples disclosed herein can be utilized in other applications. For example, the VR implementation may instead be in the context of sports training applications, military training applications, medical rehabilitation, vocational training, etc. As such, the discussion of VR implementations for entertainment applications is for illustrative purposes only and does not limit the applicability of this disclosure to other VR applications.

Figure 1B:
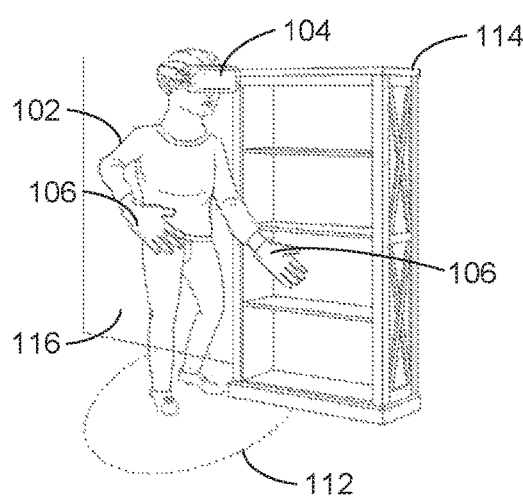
Figure 1C:
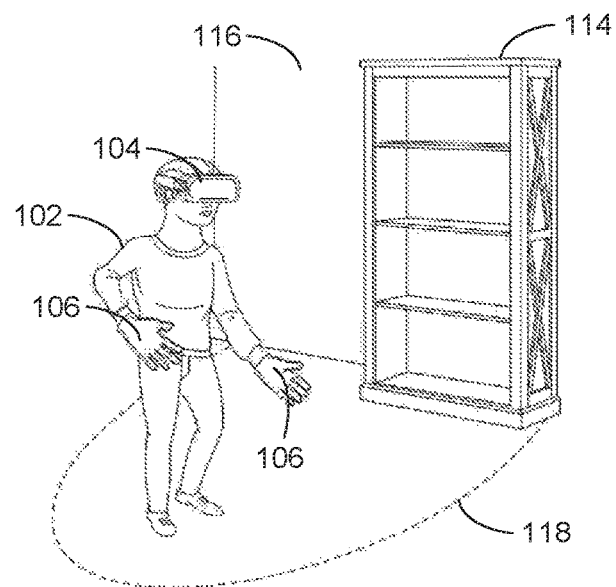

FIGS. 1A, 1B and 1C are illustrations of an example environment of use in which a user interacts with a virtual environment and a corresponding physical environment. FIG. 1A depicts a virtual environment including a user 102 with a virtual reality device 104 and virtual reality feedback device 106. The virtual environment includes an interactive area 108 including an interactive object 110.

The example user 102 is a person engaging in a virtual reality simulation. In the illustrated example of FIG. 1A, the user 102 is engaging in a basketball video game VR simulation. However, as noted above, any other type of VR application may additionally or alternatively be used such as, for example, an entertainment application, a sports training application, a military training application, a medical rehabilitation application, a vocational training application, etc.

The example virtual reality device 104 is a virtual reality headset (e.g., a head mounted display). In other examples, the virtual reality device 104 may be a display, a projector, glasses, a full-room immersion device, a mobile device, or any other type of device to present a virtual environment. In some examples, the virtual reality headset includes multiple screens to provide a high field of view display (e.g., one hundred and ten degrees), head tracking sensors, a camera, headphones, and other features.

The example virtual reality feedback device 106 works in tandem with the virtual reality device 104 to provide feedback to the user of events and interactions in the virtual environment, and to the virtual reality device 104 of the motion and interactions of the user in the physical environment. In the illustrated example of FIG. 1A, the virtual reality feedback device 106 is a pair of haptic feedback gloves. In some examples, the virtual reality feedback device 106 may be a controller, clothing with sensors, or any other device to provide enhanced capability to the virtual reality device 104. In some examples, the virtual reality device 104 itself may include feedback and sensing capabilities, with or without supplementary virtual reality feedback device 106.

The example interactive area 108 of the illustrated example of FIG. 1A is the area within the virtual environment where the user 102 can perform an interaction. In the illustrated example of FIG. 1A, the interaction includes picking up a virtual basketball from the interactive object 110 and throwing or shooting the virtual basketball in the virtual environment. The user is located in the interactive area 108 to perform this task. Accordingly, the interactive area may be considered to be more important to the simulation than other surrounding areas where an interaction is not possible. In some examples, the interactive area 108 may not include an interactive object 110, but may simply be an area where a designated action can be taken (e.g., hitting a golf ball from a tee box, where the user carries over the golf ball and golf club to the interactive area 108).

The example interactive object 110 of the illustrated example of FIG. 1A is an item with which the user 102 can virtually interact. In the illustrated example of FIG. 1A, the interactive object 110 is a rack of basketballs. The user may be able to pick up a basketball and throw it, or move the interactive object 110 by grabbing it. The interactive object 110 can be any item in the virtual environment with which the user 102 can interact.

FIG. 1B is a schematic illustration of the user 102 including the virtual reality device 104 and the virtual reality feedback device 106 interacting in the mapped environment that has been mapped using linear mapping (without importance weighting). The schematic further includes a linearly mapped interactive area 112 and interference objects 114 and 116.

The example linearly interactive area 112 of the illustrated example of FIG. 1B is the area that has been mapped during linear mapping to perform the interactions available in interactive area 108 in the virtual environment. The example linearly mapped interactive area 112 is relatively small in the mapped environment compared to the interactive area 108 the user 102 has available in the virtual environment. As a result, it is difficult for the user to perform interactions in the virtual environment without resulting in contact with interference objects 114 and 116 in the mapped environment. Further, in the interactive areas, a small motion in the mapped environment corresponds to a significantly larger motion in the virtual environment, which may seem unnatural and make some interactions more difficult. The example linearly mapped interactive area 112 may be significantly smaller due to a much smaller overall usable physical environment as compared to the size of the virtual environment. Since the linearly mapped interactive area 112 has been mapped proportionally, the overall virtual space that has been reduced to fit the physical environment during mapping has resulted in a proportional reduction in size of the linearly mapped interactive area 112.

The example interference object 114 of the illustrated example of FIG. 1B is a bookshelf. The example interference object 116 of the illustrated example of FIG. 1B is a wall. In some examples, the interference objects may be a couch, a table, or any other items that exist in the physical environment. When unweighted linear mapping is used, the linearly mapped interactive area 112 may be very small due to the overall downscaling of the virtual environment. If interactions can only be performed within these areas, the interactions may be difficult and/or result in contact with interference objects in the physical environment.

FIG. 1C is a schematic illustration of an importance-weighted linearly mapped environment in which there is an expanded interactive area 118. The schematic includes the user 102, the virtual reality device 104, the virtual reality feedback device 106, and the interference objects 114 and 116 interacting in the mapped environment. The schematic includes an expanded interactive area 118 (as compared to the linearly mapped interactive area 112 of FIG. 1B) due to importance-weighting.

The expanded interactive area 118 of the illustrated example of FIG. 1C is generated using a weighting scheme that applies a higher weight value during mapping to areas that likely involve interaction, such as the interactive area 108 of the virtual environment. The schematic illustration shows a user with significantly more space to perform the interaction available in the virtual environment. As a result, the user 102 can more easily avoid contact with interference objects 114 and 116. As compared to an unweighted linear mapping solution, the importance-weighted linear mapping solution illustrated in FIG. 1C and constructed in accordance with the teachings of this disclosure enables an enhanced virtual reality device 104 with a mapping mechanism that emphasizes the space allocated to important areas of the virtual environment (e.g., interactive areas).

Figure 2:
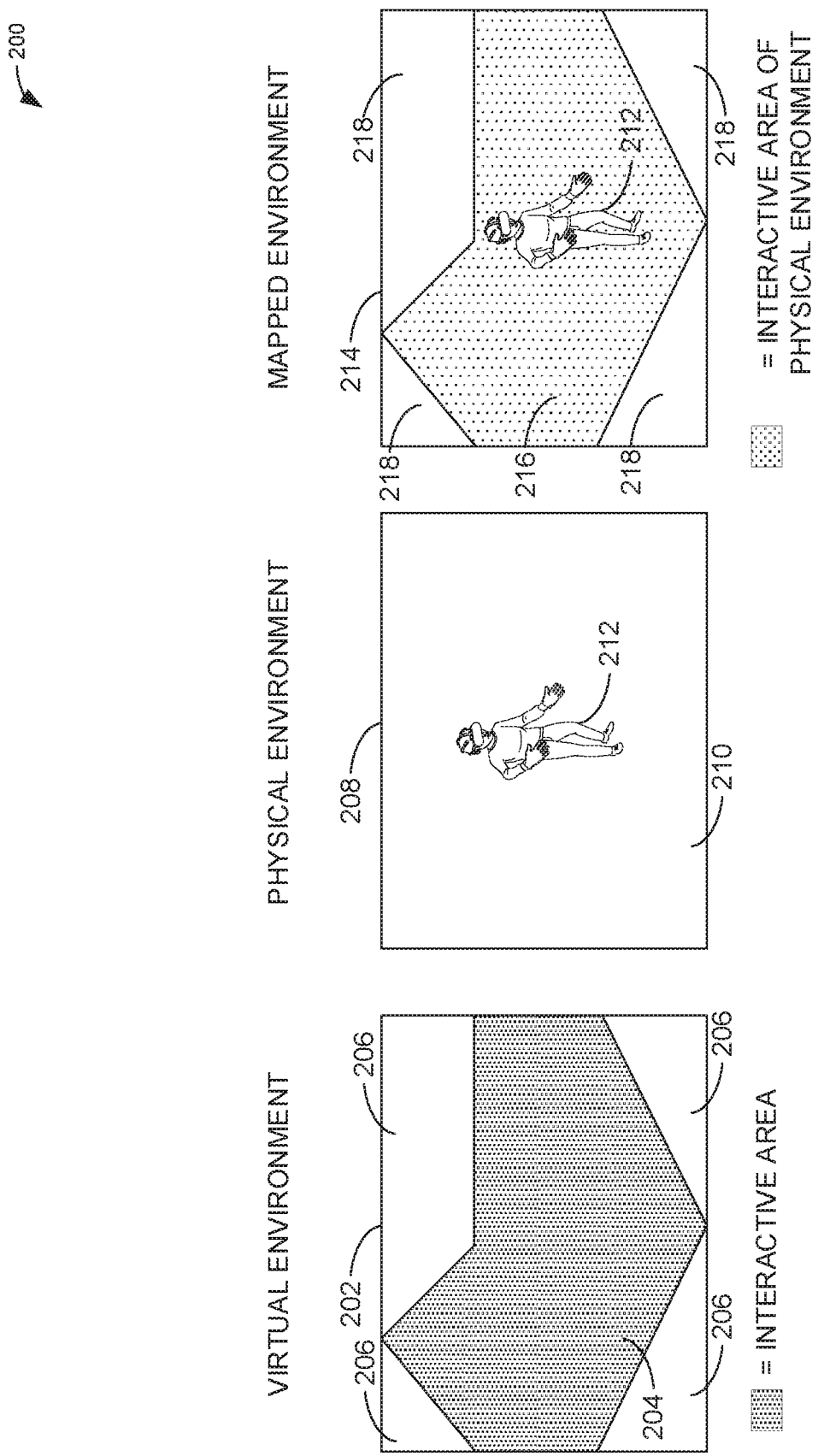
FIG. 2 is a diagram of a virtual environment, a physical environment, and the virtual environment mapped to the physical environment using a direct linear mapping.

FIG. 2 is a diagram of a virtual environment, a physical environment, and the virtual environment mapped to the physical environment using a direct linear mapping. The example virtual reality implementation 200 includes a virtual environment 202 further including an interactive area 204 and a non-interactive area 206. The example virtual reality implementation 200 further includes a physical environment 208. The physical environment 208 includes a usable area 210 and a user 212. The virtual environment 202 is then mapped to the physical environment 208, resulting in a mapped environment 214. The mapped virtual environment 214 includes the user 212, a linear mapped interactive area 216 and a mapped non-interactive area 218.

The example virtual environment 202 is a VR representation of a space. In some examples, the virtual environment may include audio elements or interactive elements. The virtual environment 202 may correspond to a real-world physical environment (e.g., a gymnasium, a park, a hiking trail, etc.), may correspond to unrecognizable environment (e.g., an unidentifiable place, such as an empty room) or may correspond to any other conceivable space that can be represented by VR data. While the virtual environment 202 is displayed as a rectangle, the virtual environment 202 may be any shape or form. Additionally, while only two dimensions of the virtual environment 202 are shown in the illustrated example of FIG. 2, a virtual environment can include space in the third dimension as well.

The example interactive area 204 of the virtual environment 202 is an area where a user can engage in an interaction (e.g., interact with an object, receive or provide instructions, interact with another being, etc.). In some examples, the interactive area 204 may include multiple different interactions possible at any given location in the interactive area 204. In some examples, the interactive area 204 may only correspond to one possible interaction. In some examples, the interactive area 204 may represent the area in the virtual environment 202 that is a specific threshold distance away from an available interaction. For example, any area which is within a specified distance (e.g., within three feet) of an area at which a user can perform an interaction may be considered to be part of the interactive area 204.

The example non-interactive area 206 of the virtual environment 202 is an area where a user cannot engage in an area-specific interaction. For example, this area may simply be included in the virtual environment 202 for visual effect to provide a realistic landscape, or to provide separation between interactive areas. In some examples, nominal interactions that are available at any location (e.g., pointing, clapping, etc.) may be possible in the non-interactive area 206.

The example physical environment 208 is the area surrounding a virtual reality implementation in the real world. The physical environment 208 may be bounded by physical barriers (e.g., walls, furniture, objects, etc.), may be bounded by software or hardware requirements (e.g., maximum camera visual range, maximum allowable physical environment size, etc.), or bounded in any other manner. Additionally, while only two dimensions of the physical environment 208 are shown in the illustration, a physical environment can include space in the third dimension as well. The example physical environment 208 is of a rectangular shape, but the physical environment may be any shape or form.

The example usable space 210 is the total space to which the virtual environment can be mapped in the physical environment 208. In the illustrated example, the usable space 210 is equal to the entire physical environment 208. This may be the case in, for example, a relatively small and empty room. In other cases, some areas of the physical environment 208 may not be usable for mapping. For example, such areas may include furniture, obstacles, additional walls, or other interference features.

The example user 212 is a person engaging with a VR implementation. The user 212 may wear a VR headset or may have other equipment to interact with the VR simulation. The user 212 exists in the physical environment 208 and the mapped virtual environment 214. While in the illustrated example of FIG. 2, a single user is shown, there may be any number of users.

The example mapped environment 214 is a representation of the virtual environment 202 in the physical environment 208. The mapped environment 214 may be of the same proportions as the virtual environment 202 or of different proportions. In the illustrated example of FIG. 2, the mapped environment 214 is of the same proportions, and has been translated using direct linear mapping (e.g., a one to one mapping). Direct linear mapping refers to the proportional translation of the virtual environment 202 onto the physical environment 208. The relative proportions of each area to the overall space are identical for the virtual environment 202 and the mapped environment 214. In some applications, this is a sufficient use of physical space. However, in some applications this results in significant mapped non-interactive spaces 218 and/or relatively small linear mapped interactive areas 216. Since the virtual environment 202 is often larger than the physical environment 208, using a proportional mapped area for the interactive area 204 may result in a very small linear mapped interactive area 216 for the user 212 to engage in interactions.

The example linear mapped interactive area 216 is an area which has been translated from the interactive area 204 of the virtual environment 202 to the physical environment 208. The linear mapped interactive area 216 is proportional relative to the entire mapped virtual environment 214 when compared to the interactive area 204 relative to the entire virtual environment 202, since linear mapping has been utilized. The actual size of the linear mapped interactive area 216 may be the same or different from the interactive area 204 of the virtual environment 202, depending upon the sizes of the virtual environment 202 and the physical environment 208. The linear mapped interactive area 216 is the physical area in which the corresponding interactions of the interactive area 204 of the virtual environment 202 can be performed.

The example mapped non-interactive area 218 is an area which has been translated from the non-interactive area 206 of the virtual environment 202. As direct linear mapping has been used in the illustrated example of FIG. 2, the mapped non-interactive area 218 relative to the area of the total mapped virtual environment 214 is proportional to the non-interactive area 207 relative to the area of the total virtual environment 202. The mapped non-interactive area 218 of the mapped virtual environment 214 is the area in which no interactions are available in the VR simulation.

Figure 3:
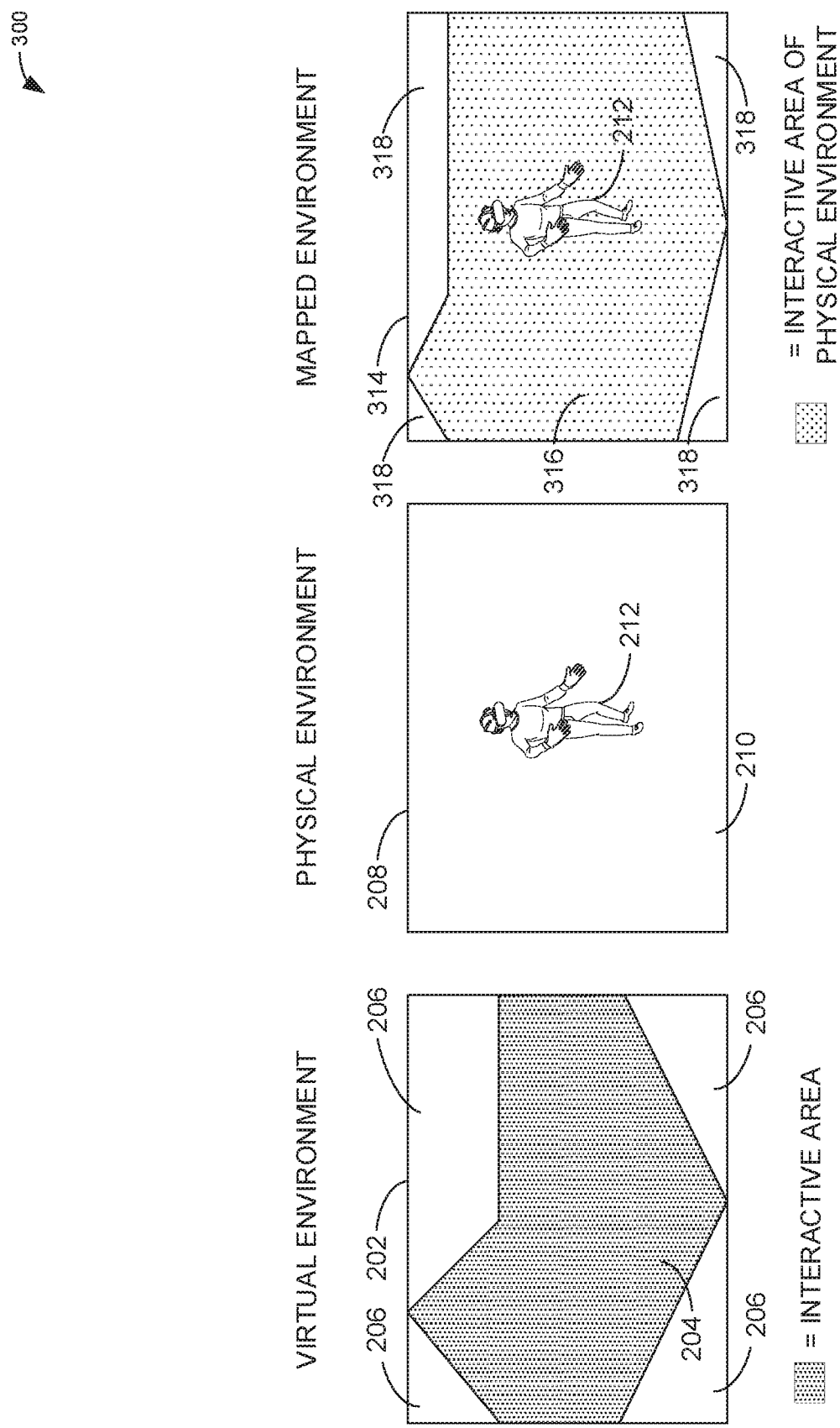
FIG. 3 is a diagram of a virtual environment, a physical environment, and a mapped environment as constructed in accordance with the teachings of this disclosure using importance-weighted linear mapping.

FIG. 3 is a diagram of a virtual environment, a physical environment, and a mapped environment as constructed in accordance with the teachings of this disclosure using importance-weighted linear mapping. The example virtual reality implementation 300 includes the virtual environment 202 and the contents included therein as well as the physical environment 208 and the contents included therein, substantially identical to the environments previously described in association with FIG. 2.

The example mapped environment 314 of the illustrated example of FIG. 3 is generated using importance-weighted linear mapping. Unlike in the previous illustrated example of FIG. 2, the weighted mapped interactive area 316 may or may not be of the same proportion relative to the total mapped virtual environment 314 as the interactive area 204 to the virtual environment 202. The mapping approach illustrated in FIG. 3 enables areas of more importance (e.g., areas with interaction possible, areas with higher importance interactions, areas with preferred gameplay or effects, etc.) to take up more physical area in the mapped environment 314. In some examples, a binary weighting style may be used, enabling some areas to be included in the mapped environment 314 and other areas to be excluded from the mapped environment. In some examples, multiple weights may be possible for any given area. For example, some areas may be more critical to the advancement of gameplay than others. However, any area which contains interaction may be more important than those that do not. In such a case, an area with interaction that is of high importance may receive a weight of "three," any other areas with interaction may receive a weight of "two," and areas without interaction may receive a weight of "one." Any method of assigning weights to achieve any objective (e.g., enlarge important gameplay areas, enlarge advertising areas, etc.) may be used.

Additionally, weighted linear mapping may incorporate adjustments, thresholds or modifications for non-rectangular physical environments or environments with object interference. For example, in a rectangular environment with a large couch in the center, the mapping technique may not use the space where the couch sits. In such an example, the weighted linear mapping may be configured to put interactive content on one side of the couch so as not to create interference during an interaction. Additionally, any modification can be made to account for irregularities or non-uniformity in the physical environment.

The example weighted mapped interactive area 316 represents the interactive area 204 of the virtual environment 202, as mapped to the physical environment 208. As the mapped virtual environment 314 is generated using importance-weighted linear mapping, the weighted mapped interactive area 316 is larger than the linear mapped interactive area 216 generated using non-weighted linear mapping (as shown in FIG. 2). In the illustrated example of FIG. 3, the interactive area 204 is assigned a weight that is twice that of the non-interactive area 206. As a result, the mapped interactive area 314 stretches in the vertical direction, as well as in the horizontal direction for the top and bottom triangular elements. The user 212 thus has more of the usable space 210 available to perform the interactions of the virtual environment 202.

The example mapped non-interactive area 318 is the non-interactive area 206, as mapped to the physical environment 208. The mapped non-interactive area 318 is smaller relative to the mapped non-interactive area 218 of the illustrated example of FIG. 2, where linear mapping was utilized without weights. As a result, the non-interactive area is reduced to enable more physical area for the interactions available in the virtual environment 302.

Figure 4:
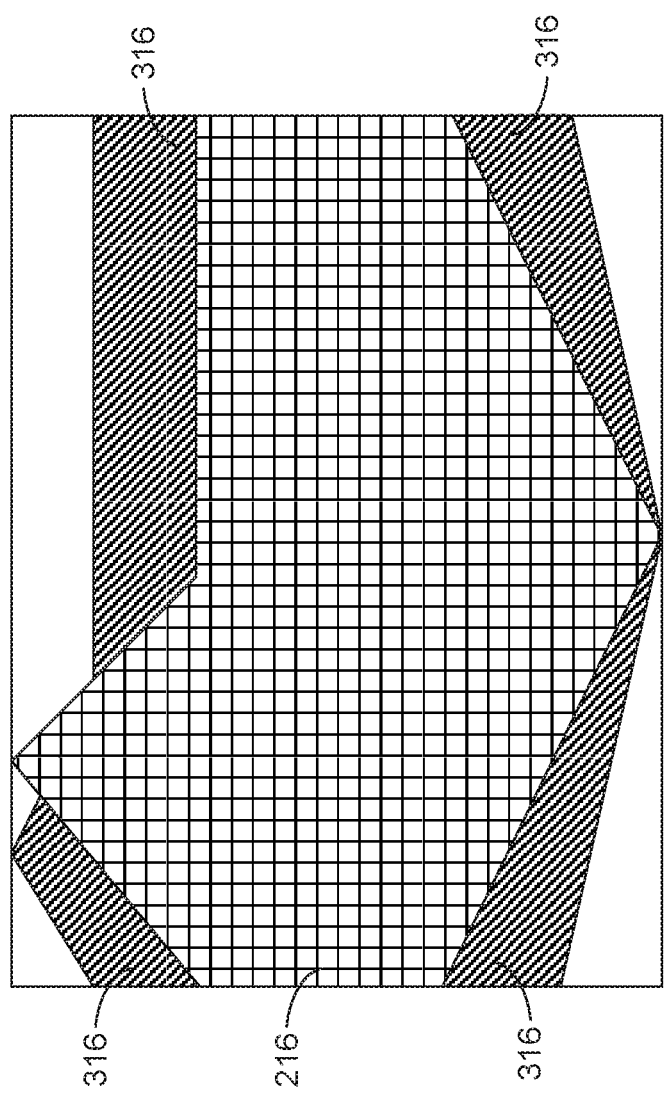
FIG. 4 is a diagram comparing the virtual environment mapped using the direct linear mapping of FIG. 3 with the virtual environment mapped using importance-weighted linear mapping of FIG. 3.

FIG. 4 is a diagram comparing the virtual environment mapped using the direct linear mapping of FIG. 3 with the virtual environment mapped using importance-weighted linear mapping of FIG. 3. FIG. 4 includes the linear mapped interactive area 216 of the mapped environment 214 from FIG. 2 and the weighted mapped interactive area 316 of the mapped environment 314 from FIG. 3. In the illustrated example of FIG. 4, the linear mapped interactive area 216 has been placed directly over the weighted mapped interactive area 316 to display the difference in size and geometry between these two mapping approaches. The linear mapped interactive area 216, which has been mapped using linear mapping, is significantly smaller than the weighted mapped interactive area 316, which has been mapped using importance-weighted linear mapping using the techniques disclosed herein. The weighted mapped interactive area 316 has a larger overall area for a user to perform interactions within since the interactive area 204 of the virtual environment has been given a higher weight than the non-interactive area 206. Utilizing importance-weighted linear mapping therefore results in a large weighted mapped interactive area 316 relative to the linear mapped interactive area 216, improving the mapped environment presented by the virtual reality device 104.

Figure 5:
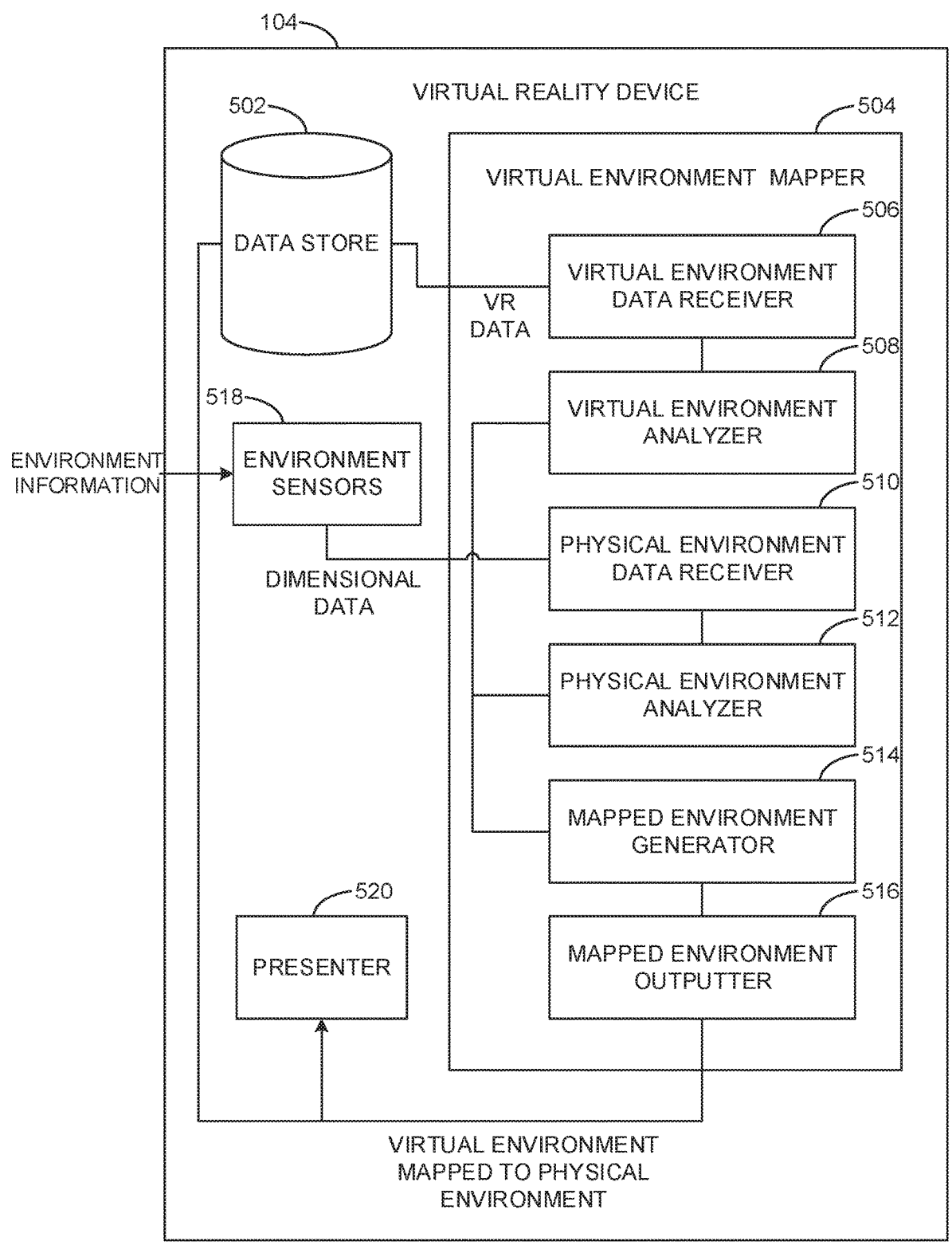
FIG. 5 is a block diagram showing an example implementation of the virtual reality device of FIG. 1.

FIG. 5 is a block diagram showing an example implementation of the virtual reality device of FIG. 1. The example virtual reality device 104 includes a data store 502 and a virtual environment mapper 504. The virtual environment mapper 504 includes a virtual environment data receiver 506, a virtual environment analyzer 508, a physical environment data receiver 510, a physical environment analyzer 512, a mapped environment generator 514, and a mapped environment outputter 516. The virtual reality device 104 further includes environment sensors 518 and a presenter 520.

The example data store 502 of the illustrated example of FIG. 5 stores VR data for use by the virtual reality device 104. The example data store 502 of the illustrated example of FIG. 5 is implemented by any memory, storage device and/or storage disc for storing data such as, for example, flash memory, magnetic media, optical media, etc. Furthermore, the data stored in the example data store 502 may be in any data format such as, for example, binary data, comma delimited data, tab delimited data, structured query language (SQL) structures, etc. While in the illustrated example the data store 502 is illustrated as a single element, the example data store 502 and/or any other data storage elements described herein may be implemented by any number and/or type(s) of memories. In the illustrated example of FIG. 5, the example data store 502 stores virtual reality data pertaining to a virtual environment. The example data store 502 may transmit the VR data to the virtual environment data receiver 506. The data store 502 may be physical storage located on the virtual reality device 104, may be removable storage that can be connected to the virtual reality device 104, may be a virtual storage location accessible via a network (e.g., the Internet) or may be in any other location or configuration.

The example virtual environment mapper 504 of the illustrated example of FIG. 5 is capable of performing importance-weighted linear mapping in accordance with the teachings of this disclosure. The virtual environment mapper 504 receives requests for the presentation of virtual environments, accesses and analyzes virtual and physical environment data, generates mapped environments, and prepares mapped environments for output by other devices such as the presenter 520. The virtual environment mapper 504 includes the virtual environment data receiver 506, the virtual environment analyzer 508, the physical environment data receiver 510, the physical environment analyzer 512, the mapped environment generator 514 and the mapped environment outputter 516. In some examples, the virtual environment mapper 504 itself may present the mapped environment. In some examples, the virtual environment mapper 504 is separate from the virtual reality device 104. For example, the virtual environment mapper 504 may be on a computer that provides mapped environments to the virtual reality device 104. In some examples, the virtual environment mapper 504 is implemented via software. In such examples, the virtual environment mapper 504 may be stored on the virtual reality device 104 or may be accessible via a network.

The example virtual environment data receiver 506 of the illustrated example of FIG. 5 accesses virtual environment data including visual data, audio data, interaction data, metadata, and any other data pertaining to the virtual environment. The virtual environment data receiver 506 may receive requests for the presentation of a virtual environment or may initiate the data retrieval based on a predetermined ordering of environments to display (e.g., as in a demo configuration) or based on specific conditions of the virtual reality device 104 (e.g., a time of day, a location of the virtual reality device 104, etc.). In some examples, the virtual environment data receiver 506 may process a request for the environment to be mapped based on an updated position of the virtual reality device 104. The virtual environment data receiver 506 may retrieve virtual environment data from the data store 502 or from any other location.

The example virtual environment analyzer 508 of the illustrated example of FIG. 5 assigns weights to areas in the virtual environment for use in generating an importance-weighted linearly mapped environment. The virtual environment analyzer 508 divides the virtual environment into units by dividing the overall virtual environment at an interval in a first and a second direction. For example, the virtual environment analyzer 508 may divide a rectangular environment into smaller rectangular units. The virtual environment analyzer 508 determines weights of the units of the virtual environment based on various criteria (e.g., areas of the physical environment of higher importance, areas involving more interaction, areas including critical gameplay features, etc.). The virtual environment analyzer 508 determines if units include interactive elements or features available within the unit bounds. The virtual environment analyzer 508 identifies the presence of interactive features within the unit bounds. In some examples, the virtual environment analyzer 508 may be configured with thresholds to determine the kind of features that qualify as interactive features. For example, interactive features which are universal (e.g., available anywhere in the virtual environment) may not qualify as interactive features in determining if a unit includes interactive features.

In some examples, the virtual environment analyzer 508 assigns units with interactive features a high weight value relative to units without interactive features. In some examples, a tiered or multi-level weighting system may be used. In such examples, the virtual environment analyzer 508 assigns numerous weights to different units. In examples where a multi-weight system is used, the virtual environment analyzer 508 assigns multiple weight values for varying levels of interaction and importance. In such examples, a variable system can be used wherein the weight value corresponds to a measure associated with the number of interactive elements available in a unit (e.g., a weight value of "one" for one interactive element, a weight value of "two" for two interactive elements, etc.).

Additional factors may be incorporated into determining the weight values assigned to units. For example, a unit's distance from an optimal path through the environment, a unit's proximity to other important units, a unit's similarity to neighboring units, or any other aspect may be included in determining a weight value for the unit. In some examples, a binary system may be utilized wherein units including interactive features receive one weight value and units without interactive features receive a different weight value. The virtual environment analyzer 508 may additionally determine the dimensions of the virtual environment, for use by the mapped environment generator 514.

In some examples, the example virtual environment analyzer 508 additionally applies a smoothing function or algorithm to blur the boundary between units of different weights. For example, instead of a sharp drop in weight value between two units, a unit may have a variable weight that gradually increases or decreases to match the weight value of a neighboring unit at its boundary. In some examples, applying the smoothing function involves reanalyzing and reprocessing the units. In some examples, the smoothing function may cause reanalysis and/or re-processing of weight values for areas that are identified as including boundaries that meet a specific threshold to be smoothed (e.g., a quantified transition in weight values within a specified number of units or distance).

The example physical environment data receiver 510 of the illustrated example of FIG. 5 is implemented by one or more sensors to access data pertaining to the physical environment to determine the dimensions of the physical environment. The example physical environment data receiver 510 collects dimensional data, or data used to determine dimensional data, from the environment sensors 518. For example, the physical environment data receiver 510 may process, collect, and combine data streams to generate dimensional data to be passed to the physical environment analyzer 512. In some examples, the physical environment data receiver 510 receives user input data regarding the physical environment. For example, a user may specify that only a designated area of the physical environment is usable by inputting dimensions of a usable space. The data accessed by the physical environment data receiver 510 may be dimensions, may be direct sensor outputs, or may be any other data to help the physical environment analyzer 512 determine the dimension and map of the physical environment.

The example physical environment analyzer 512 of the illustrated example of FIG. 5 determines, based on the physical environment data received by the physical environment data receiver 510, the dimensions of the physical environment. In some examples, the physical environment analyzer 512 may additionally determine features of the physical environment, including any objects in the environment, obstacles, the shape of the environment, and any other features to better understand and enable mapping of the physical environment. In some examples, the physical environment analyzer 512 may process, combine, or otherwise manipulate the outputs of environment sensors 518 to determine the characteristics of the physical environment.

The example mapped environment generator 514 of the illustrated example of FIG. 5 utilizes a weighted linear mapping technique to map the virtual environment to the physical environment. The mapped environment generator 514 determines dimensions and coordinates for units from the virtual environment in the mapped environment in the X-direction (e.g., horizontally) and Y-direction (e.g., vertically). In examples disclosed herein, the mapped environment generator 514 utilizes an algorithm to assign units of the virtual environment to the mapped environment. The algorithm may be described in accordance with the weighted linear function represented by Equation 1 and Equation 2 below:

$$x' = \frac{W}{\sum_{i=1}^{W} f(i, y) * x_i} * \sum_{i=1}^{x} f(i, y) * x_i \quad \text{Equation 1}$$

$$y' = \frac{L}{\sum_{i=1}^{L} f(x, i) * y_i} * \sum_{i=1}^{y} f(x, i) * y_i \quad \text{Equation 2}$$

In the illustrated example of Equation 1, the variable x' refers to the horizontal coordinate in the mapped environment, W refers to the overall width of the physical environment, f(I,y) refers to the weighting function, $x_i$ refers to the instantaneous position in the horizontal direction, and y refers to the position in the vertical direction.

Similarly, in the illustrated example of Equation 2, the variable y' refers to the vertical coordinate in the mapped environment, L refers to the overall length of the physical environment, f(x,i) refers to the weighting function, $y_i$ refers to the instantaneous position in the vertical direction, and x refers to the position in the horizontal direction.

The weighting function (e.g., (f(x,i)) as used in Equation 1 and Equation 2, can be any function to emphasize areas of higher importance. In examples disclosed herein, weights are assigned corresponding to step sizes (e.g., at each interval) by the virtual environment analyzer 508. In such examples, the weight values may be constant values associated with the presence or amount of interactive features in a unit (e.g., at a given step interval). In some examples, Equation 1 and Equation 2 are solved substantially simultaneously.

In some examples, one direction is analyzed first (e.g., X' values are determined for units, and then Y' values are determined for units, or the reverse order). The mapped environment generator 514 may successively select columns, (e.g., units aligned vertically in the Y-direction), for analysis. To calculate unit dimensions and coordinates in the Y-direction, the mapped environment generator 514 determines the sum of the weighting values present in the column by adding the weight values previously assigned by the virtual environment analyzer 508 to units in the column. The example mapped environment generator 514 determines the dimension in the Y-direction for the column to be equal to the Y-direction range (e.g., the maximum dimension in the Y-direction) for the physical environment. In some examples, the mapped environment generator 514 determines the dimension in the Y-direction based on data received by the physical environment data receiver 508 from the environment sensors 518. In some examples, the dimension may be uniform throughout the physical environment (e.g., in a rectangular physical environment). In other examples, the mapped environment generator 514 may determine the dimension in the Y-direction based upon the dimension in the Y-direction of the column's corresponding projected position in the physical environment. The example mapped environment generator 514 then divides the dimension in the Y-direction by the sum of the weighting values to create a scale value representative of the height of a unit with a weight of one in the mapped environment. The mapped environment generator 514 applies the scale value to units to determine an adjusted dimension for units by multiplying the scale value and the weight value for a given unit.

The virtual environment generator 514 utilizes the adjusted dimension to determine coordinates in the mapped environment for units. For example, the mapped environment generator 514 may determine a first and a second value in the Y-direction for a unit in the mapped environment based on the adjusted dimension and the second Y-value of the previous unit in the column. In some examples, the same process can be utilized to calculate unit dimensions and coordinates in the X-direction, analyzing rows instead of columns. Dimensions and coordinates for units in the mapped environment are stored by the virtual environment generator 514 in the data store 502 or in any other accessible storage location. In some examples, dimensions and coordinates for units in the X-direction and Y-direction are stored in the same location. The mapped environment generator 514 generates dimensions and coordinates for rows and columns until the rows and columns of the virtual environment have been analyzed. In some locations, dimensions and coordinates for units in the X-direction are stored in a different location than dimensions and coordinates for units in the Y-direction. In some examples, the mapped environment generator 514 may additionally take into account a user's location and orientation in the physical environment, as ascertained by the environment sensors 518, when generating the mapped environment.

The example mapped environment outputter 516 of the illustrated example of FIG. 5 prepares a representation of the mapped environment for display. The mapped environment outputter 516 transmits or communicates this representation to the presenter 520, which presents this representation to a participant of the VR simulation. The mapped environment outputter 516 may dimensionally compress the visual data of the virtual environment according to the mapped environment (e.g., visually shrink the environment to fit the physical environment). The mapped environment outputter 516 may determine the appropriate audio data, interactive data, and other VR data to display to represent the mapped environment and transmit or communicate this data to the presenter 520.

The example environment sensors 518 of the illustrated example of FIG. 5 are sensors associated with the virtual reality device 104 that are capable of obtaining data pertaining to the physical environment. In some examples, the data collected by the environment sensors 518 may include dimensional data. In some examples, the data collected by the environment sensors 518 may be processed to determine dimensions and other features of the physical environment. The environment sensors 518 may include, but are not limited to, vision sensors (e.g., cameras), gyroscopes, magnetometers, infrared sensors, capacitive transducers, ultrasonic sensors, proximity sensors, position sensors, and any other type of sensors to collect data on the physical environment. In some examples, the environment sensors 518 may be used to determine a user's location and orientation.

The example presenter 520 of the illustrated example of FIG. 5 is capable of presenting the representation of the mapped environment. In some examples, the presenter 520 may present the mapped environment via a display built into the virtual reality device 104 (e.g., a display on the headset) or via a separate device (e.g., a projector). The presenter 520 may include additional features such as speakers, haptic response mechanisms, and/or any other output devices to create a realistic, multi-faceted representation of the mapped environment.

In operation, the data store 502 supplies the virtual environment data receiver 506 with virtual reality data corresponding to a virtual environment. The virtual environment analyzer 508 analyzes the VR data received by the virtual environment data receiver 506 by dividing the virtual environment into units and assigning importance weights to the units. The physical environment data receiver 510 receives data pertaining to the physical environment from the environment sensors 518 that the physical environment analyzer 512 utilizes to determine the dimensions and features of the physical environment. The mapped environment generator 514 then uses the physical environment dimensions and features and the analyzed virtual environment to generate an importance-weighted, linearly mapped environment. After the mapped environment has been generated, the mapped environment outputter 516 assembles and prepares the appropriate VR data to represent the mapped environment. The mapped environment outputter 516 outputs this representation to the presenter 520 to generate a presentation of the mapped environment.

While an example of implementing the virtual reality device 104 of FIG. 1 is illustrated in FIG. 5, one or more of the elements, processes and/or devices illustrated in FIG. 5 may be combined, divided, re-arranged, omitted, eliminated, and/or implemented in any other way. Further, the example data store 502, the example virtual environment mapper 504, the example virtual environment data receiver 506, the example virtual environment analyzer 508, the example physical environment data receiver 510, the example physical environment analyzer 512, the example mapped environment generator 514, the example mapped environment outputter 516, the example environment sensors 518, the example presenter 520 and/or, more generally, the example virtual reality device 104 of FIG. 5 may be implemented by hardware, software, firmware and/or any combination of hardware, software and/or firmware. Thus, for example, any of the example data store 502, the example virtual environment mapper 504, the example virtual environment data receiver 506, the example virtual environment analyzer 508, the example physical environment data receiver 510, the example physical environment analyzer 512, the example mapped environment generator 514, the example mapped environment outputter 516, the example environment sensors 518, the example presenter 520 and/or, more generally, the example virtual reality device 104 and/or, more generally, the example virtual reality device 104 of FIG. 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, data store 502, the example virtual environment mapper 504, the example virtual environment data receiver 506, the example virtual environment analyzer 508, the example physical environment data receiver 510, the example physical environment analyzer 512, the example mapped environment generator 514, the example mapped environment outputter 516, the example environment sensors 518, the example presenter 520 and/or, more generally, the example virtual reality device 104 of FIG. 5 is/are hereby expressly defined to include a non-transitory computer readable storage device or storage disk such as a memory, a digital versatile disk (DVD), a compact disk (CD), a Blu-ray disk, etc. including the software and/or firmware. Further still, the example virtual reality device 104 of FIG. 5 may include one or more elements, processes and/or devices in addition to, or instead of, those illustrated in FIG. 5, and/or may include more than one of any or all of the illustrated elements, processes, and devices.

Flowcharts representative of example machine readable instructions for implementing the virtual environment mapper 504 of FIG. 5 are shown in FIGS. 6, 7, 8, 9, and/or 10. In this example, the machine readable instructions comprise a program for execution by a processor such as a processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIGS. 6, 7, 8, 9, and/or 10, many other methods of implementing the example virtual reality device 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 6, 7, 8, 9, and/or 10 may be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

Figure 6:
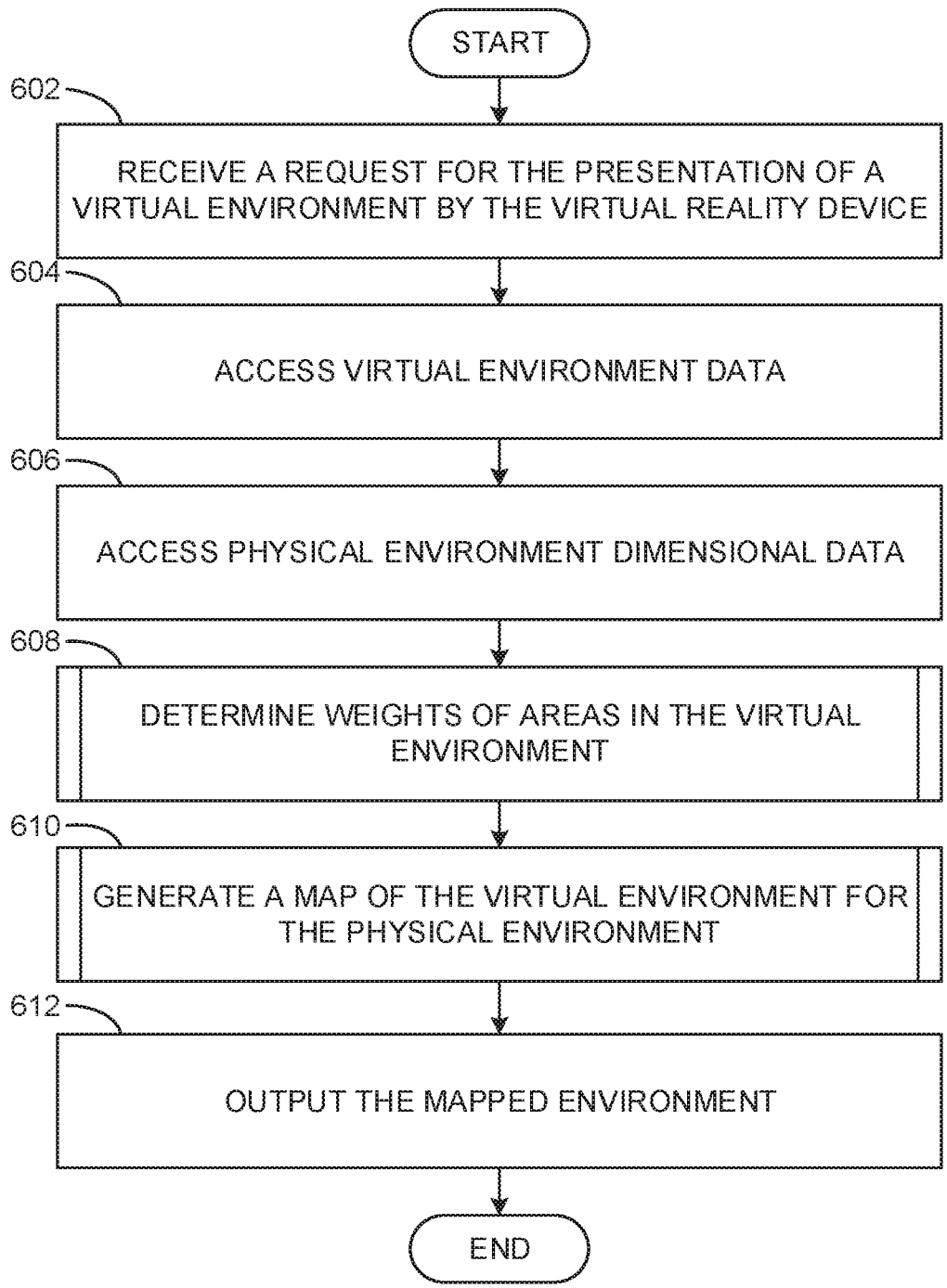
FIG. 6 is a flowchart representative of machine readable instructions that may be used to implement the example virtual environment mapper of FIG. 5 to perform importance-weighted linear mapping.

FIG. 6 is a flowchart representative of machine readable instructions that may be used to implement the example virtual environment mapper of FIG. 5 to perform importance-weighted linear mapping. With reference to the preceding figures and associated descriptions, the example process 600 of FIG. 6 begins when the example virtual environment mapper 504 receives a request for the presentation of a virtual environment by the virtual reality device 104 (Block 602). In examples disclosed herein, the virtual environment data receiver 506 receives a request from a control device (e.g., a controller, buttons on the headset, voice commands received by a microphone, etc.) to display a virtual environment. In some examples, the virtual environment data receiver 506 may continually receive requests based on the current position and orientation of the virtual reality device 104. In such examples, if the virtual reality device 104 changes location in the physical environment, a request may be processed by the virtual environment data receiver 506 to map the environment based on the updated position of the virtual reality device 104. In some examples, the virtual environment data receiver 506 may not receive a request from a control device for a virtual environment to be presented but may initiate the process of mapping an environment based on a predetermined ordering of environments to display (e.g., a repetitive demo configuration) as opposed to a received request. In some examples, the virtual environment mapper 504 may map the virtual environment at a regular interval (e.g., every ten seconds, every thirty seconds, etc.). In some examples, the virtual environment data receiver 506 may initiate a mapping process for the presentation of a virtual reality environment on a separate virtual reality device 104. For example, the virtual environment mapper 504 may actually exist on a first device (e.g., a computer, a gaming console, etc.) and the virtual environment may be presented on a second device (e.g., a headset, a display, etc.).

The example virtual environment mapper 504 accesses the virtual environment data (Block 604). In examples disclosed herein, the example virtual environment data receiver 506 accesses the virtual environment data including visual data, audio data, interaction data, metadata, and any other data pertaining to the virtual environment. The virtual environment data receiver 506 may retrieve this data from a data store 502 of the virtual reality device 104.

The example virtual environment mapper 504 accesses physical environment dimensional data (Block 606). In examples disclosed herein, the example physical environment data receiver 510 accesses data obtained from environment sensors 518 to determine the dimensions of the physical environment. In some examples, the example physical environment data receiver 510 may additionally receive user input data regarding the physical environment. For example, a user may specify that only a specified area of the physical environment is usable by inputting dimensions of a usable space. The physical environment data may be in any format, such as outer dimensions (e.g., length and width), a 2D or 3D physical environment map depicting items within the sensing area, or an outline of the physical environment. In some examples, the physical environment data receiver 510 may collect and combine data streams (e.g., from multiple different environment sensors 518) to generate dimensional data to be passed to the physical environment analyzer 512. In some examples, data streams corresponding to data may be separately collected and passed to the physical environment analyzer 512 to determine dimensions and features of the physical environment. In some examples, a user's location in the physical environment may be accessed in order to appropriately map the virtual environment according to the user's location and orientation. In such examples, the environment sensors 518 are utilized to determine the user's location. The user's location and orientation data may result in a different orientation, a different perspective, or different overall dimensions of the mapped virtual environment. For example, a user location that is very close to one wall in a room may result in a mapped environment that stretches to a more open area of the physical environment with more open space, away from the wall.

The example virtual environment mapper 504 determines weights of areas in the virtual environment (Block 608). In examples disclosed herein, the example virtual environment analyzer 508 determines weights of areas in the virtual environment based on various criteria (e.g., areas of the physical environment of higher importance, areas involving more interaction, areas including critical gameplay features, etc.). Example approaches for determining weights of areas on the virtual environment are disclosed in further detail in connection with FIG. 7.

The example virtual environment mapper 504 generates a map of the virtual environment for the physical environment (Block 610). In examples disclosed herein, the example mapped environment generator 514 utilizes a weighted linear mapping technique to map the virtual environment to the physical environment. Example approaches for generating the map of the virtual environment utilizing the weighted linear mapping technique are disclosed in further detail in connection with FIG. 8.

The virtual environment mapper 504 outputs the mapped environment (Block 612). In examples disclosed herein, the mapped environment outputter 516 prepares, on the basis of the mapped virtual environment, the representation of the virtual environment for display by the presenter 520. In some examples, the mapped environment outputter 516 dimensionally compresses the visual data of the virtual environment according to the mapped virtual environment (e.g., shrink the virtual environment to fit the physical environment). In some examples, the mapped environment outputter 516 may determine, on the basis of the mapped environment, the appropriate VR data to display of the VR data initially received by the virtual environment data receiver 506. The presenter 520 may present the virtual environment via a display built into the virtual reality device 104 (e.g., a display on a headset) or may be part of a separate device (e.g., a projector). Further, the mapped environment outputter 516 may determine the appropriate audio data, interactive data, and other VR data to display to represent the mapped virtual environment. In such examples, the output display may further output VR data corresponding to noises, interactive feedback and signals (e.g., haptic feedback) corresponding to the mapped virtual environment, or any other relevant data to create a realistic, multi-faceted representation of the mapped environment.

Figure 7:
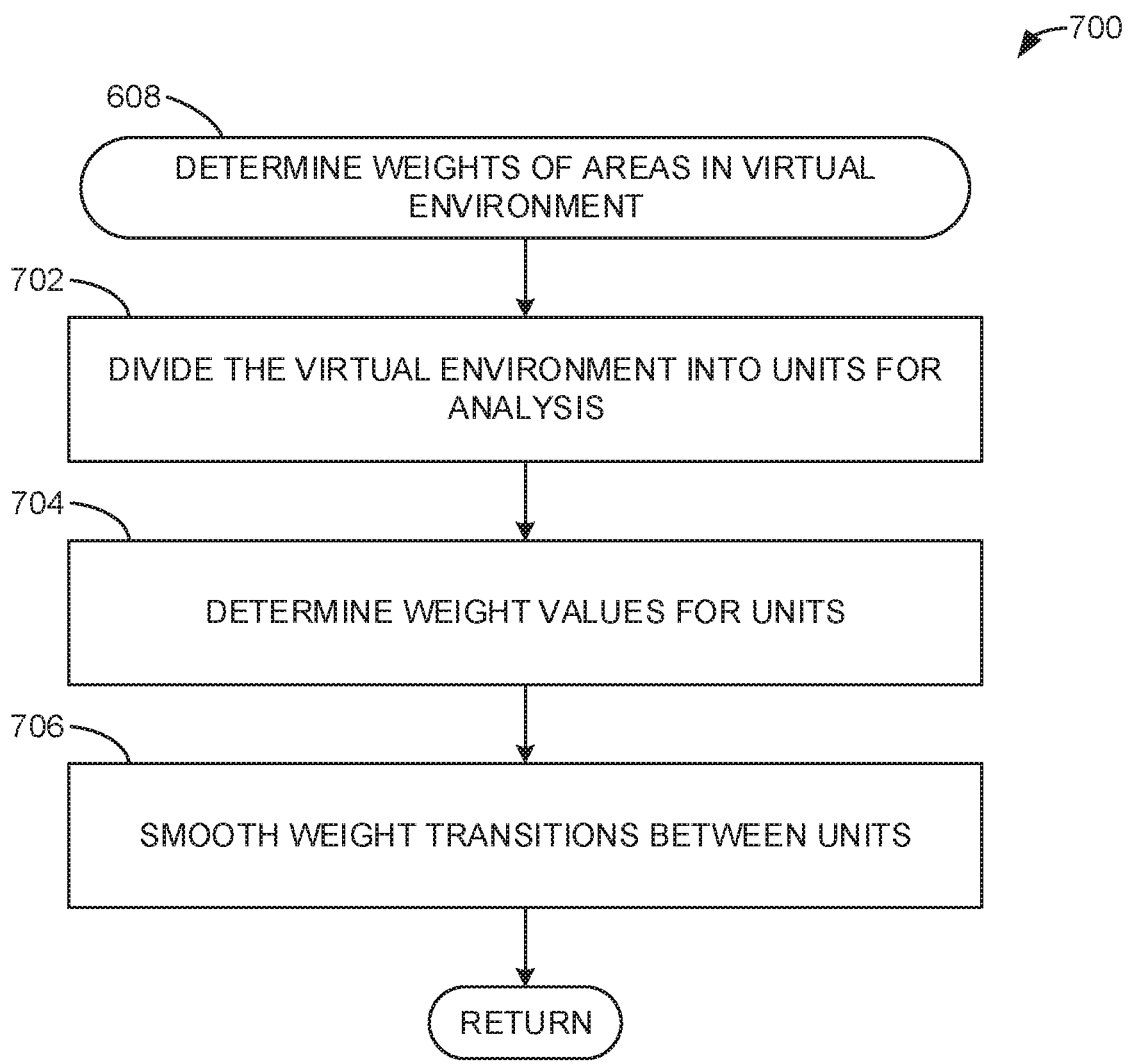
FIG. 7 is a flowchart representative of machine readable instructions that may be used to implement the example virtual environment mapper of FIG. 5 to determine weights of areas of a virtual environment.

FIG. 7 is a flowchart representative of machine readable instructions that may be used to implement the example virtual environment mapper of FIG. 5 to determine weights of areas of a virtual environment. With reference to the preceding figures and associated descriptions, the example process 700 of FIG. 7 begins with the example virtual environment mapper 504 dividing the virtual environment into units for analysis (Block 702). In examples disclosed herein, the virtual environment analyzer 508 divides the virtual environment that has been received by the virtual environment data receiver 506 into units by dividing the overall virtual environment at an interval in a first direction and an interval in a second direction. For example, the virtual environment may be divided into ten parts in the horizontal or "X" direction and into ten parts in the vertical or "Y" direction. The interval, or step size, at which the virtual environment is divided can be set to any value to achieve the desired resolution and granularity for assigning values of relative importance to areas. In some examples, a non-uniform interval may be used. In some examples, a non-rectangular unit shape may be used. For example, the virtual environment may be divided into triangles.

The example virtual environment mapper 504 determines weight values for units (Block 704). In examples disclosed herein, the example virtual environment analyzer 508 assigns weight values to units based on interactive features in the area. For example, the virtual environment analyzer determines, based on the virtual reality data received by the virtual environment data receiver 506, if any interactive elements are present or available within the bounds of the current unit of analysis. For example, a unit may identify an interactive feature in an area at which a bow can be picked up and shot at a target, or an area where a player can hit a golf ball off a tee. In some examples, a threshold may exist to only determine certain kinds of interactive features. For example, in some virtual environments, universal interactive features may be available throughout the virtual environment (e.g., summoning an item, interacting with another player, performing physical actions such as jumping, etc.). In such examples, only interactive features that are specific to certain areas, or that have importance to advancing gameplay, may be identified as interactive features. In some examples, the example virtual environment analyzer 508 assigns a high weight value (e.g., a value of "two," "three," etc.) to a unit if the unit includes interactive features relative to the weight value (e.g., a value of "zero", a value of "one", etc.) used for units without interactive features. In some examples, units including interactive elements may be emphasized significantly more than non-interactive units (e.g., units not including interactive elements), resulting in a significantly higher weight value relative to the weight value used for non-interactive units. In some examples, a multi-weight system may be used, assigning multiple weight values for varying levels of interaction and importance. In such examples, a variable system can be used wherein the weight value corresponds to a measure associated with the number of interactive elements available in a unit (e.g., a weight value of "one" for one interactive element, a weight value of "two" for two interactive elements, etc.). In some examples, additional factors may be incorporated into determining the weight values assigned to units. For example, a unit's distance from an optimal path through the environment, a unit's proximity to other important units, a unit's similarity to neighboring units, or any other aspect may be included in determining a weight value for the unit. Any methodology for determining weight values to enhance the mapped environment may be utilized.

The example virtual environment mapper 504 smooths the weight transitions between units (Block 706). In examples disclosed herein, the example virtual environment analyzer 508 applies a smoothing function or algorithm to blur the boundary between units of different weight values. In some examples, the weight values assigned by the virtual environment mapper 504 may result in large differentials in the weight values assigned to nearby units. For example, one unit may have a relatively high weight value compared to the neighboring units around it (e.g., a unit having a weight value of five surrounded by units with weight values of zero). In such examples, a user engaging in the virtual reality simulation may experience an unnatural motion effect when the user's motion is represented in the mapped environment. In some examples, a smoothing or blurring function may be applied to the units. The smoothing function may apply a gradient to areas with differing weights. For example, instead of a sharp drop in weight value between two units, a unit may have a variable weight that gradually increases or decreases to match the weight value of a neighboring unit at its boundary. The smoothing function can be any function which helps to smooth, blur, or normalize boundaries between units to create a more gradual shift in weight values between units. In some examples, applying the smoothing function involves reprocessing individual units. In some examples, the smoothing function may only reprocess weight values for areas that are identified as including boundaries that meet a specific threshold to be smoothed (e.g., a quantified transition in weight values within a specified number of units or distance).

Figure 8:
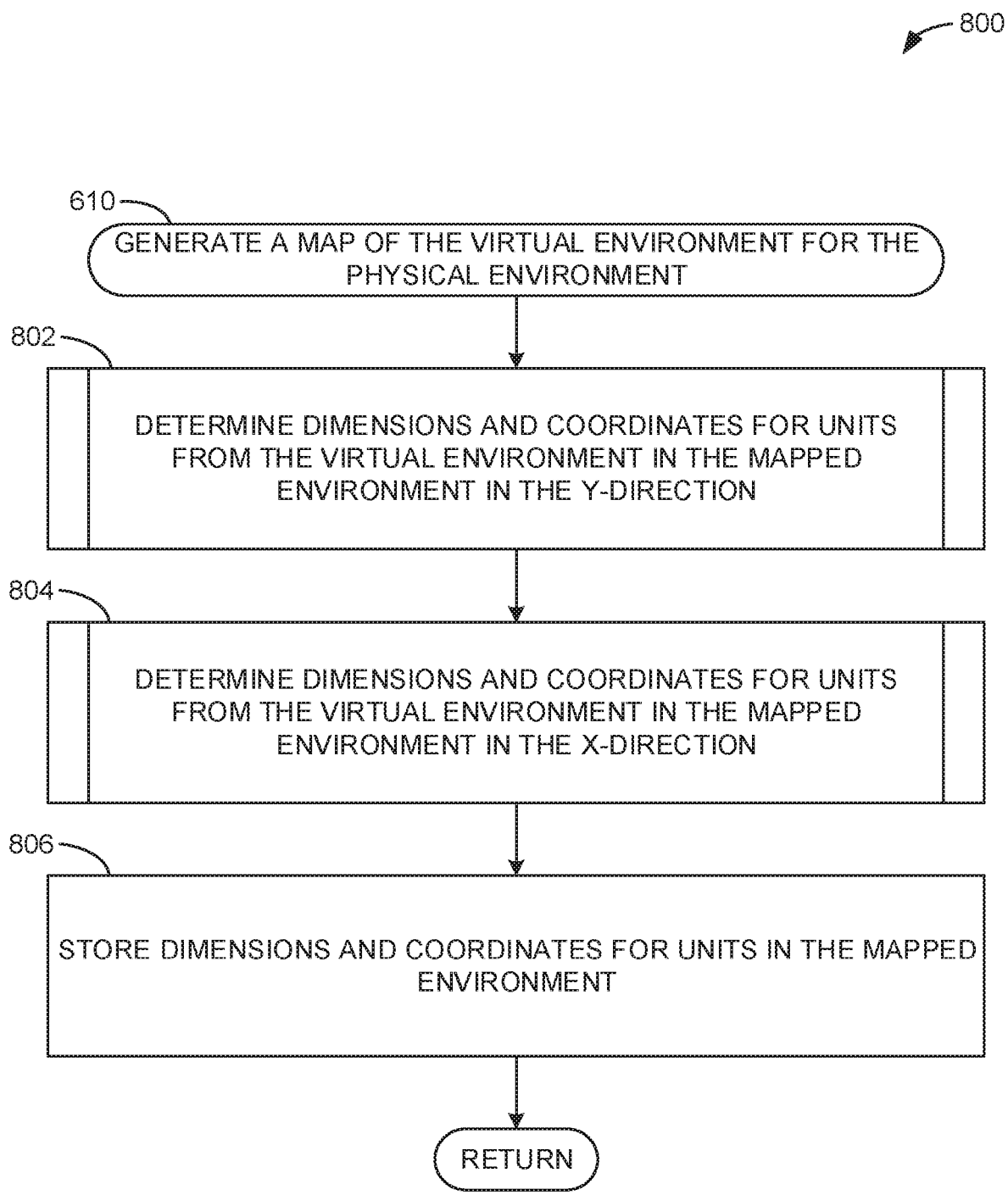
FIG. 8 is a flowchart representative of machine readable instructions that may be used to implement the example virtual environment mapper of FIG. 5 to generate a map of the virtual environment for the physical environment using the virtual environment mapper of FIG. 5.

FIG. 8 is a flowchart representative of machine readable instructions that may be used to implement the example virtual environment mapper of FIG. 5 to generate a map of the virtual environment for the physical environment using the virtual environment mapper of FIG. 5. With reference to the preceding figures and associated descriptions, the example process 800 begins with the example virtual environment mapper 504 determining dimensions and coordinates for units from the virtual environment in the mapped environment in the Y-direction (Block 802). In examples disclosed herein, the mapped environment generator 514 determines dimensions and coordinates for units from the virtual environment in the mapped environment in the Y-direction. Example approaches for determining dimensions and coordinates for units from the virtual environment in the mapped environment in the Y-direction are disclosed in further detail in connection with FIG. 9.

The example virtual environment mapper 504 determines dimensions and coordinates for units from the virtual environment in the mapped environment in the X-direction (Block 804). In examples disclosed herein, the mapped environment generator 514 determines dimensions and coordinates for units from the virtual environment in the mapped environment in the X-direction. Example approaches to determine dimensions and coordinates for units from the virtual environment in the mapped environment in the X-direction are disclosed in further detail in connection with FIG. 10. In some examples, the dimensions and coordinates for units are determined in the Y-direction (e.g., as in Block 802) and then determined in the X-direction (e.g., as in Block 804). In some examples, dimensions and coordinates are determined in both directions substantially simultaneously.

The example virtual environment mapper 504 stores dimensions and coordinates for units in the mapped environment (Block 806). In examples disclosed herein, the mapped environment generator 514 stores dimensions and coordinates for units in the mapped environment in the data store 502. In some examples, any other data storage location accessible to the virtual environment mapper 504 may be used for storage. In some examples, the mapped environment generator 514 stores the dimensions and coordinates for units in the X-direction along with the dimensions and coordinates for units in the Y-direction. The dimensions and coordinates for the X-direction and the Y-direction may be stored separately and prepared as a complete mapped environment by the mapped environment outputter 516.

Figure 9:
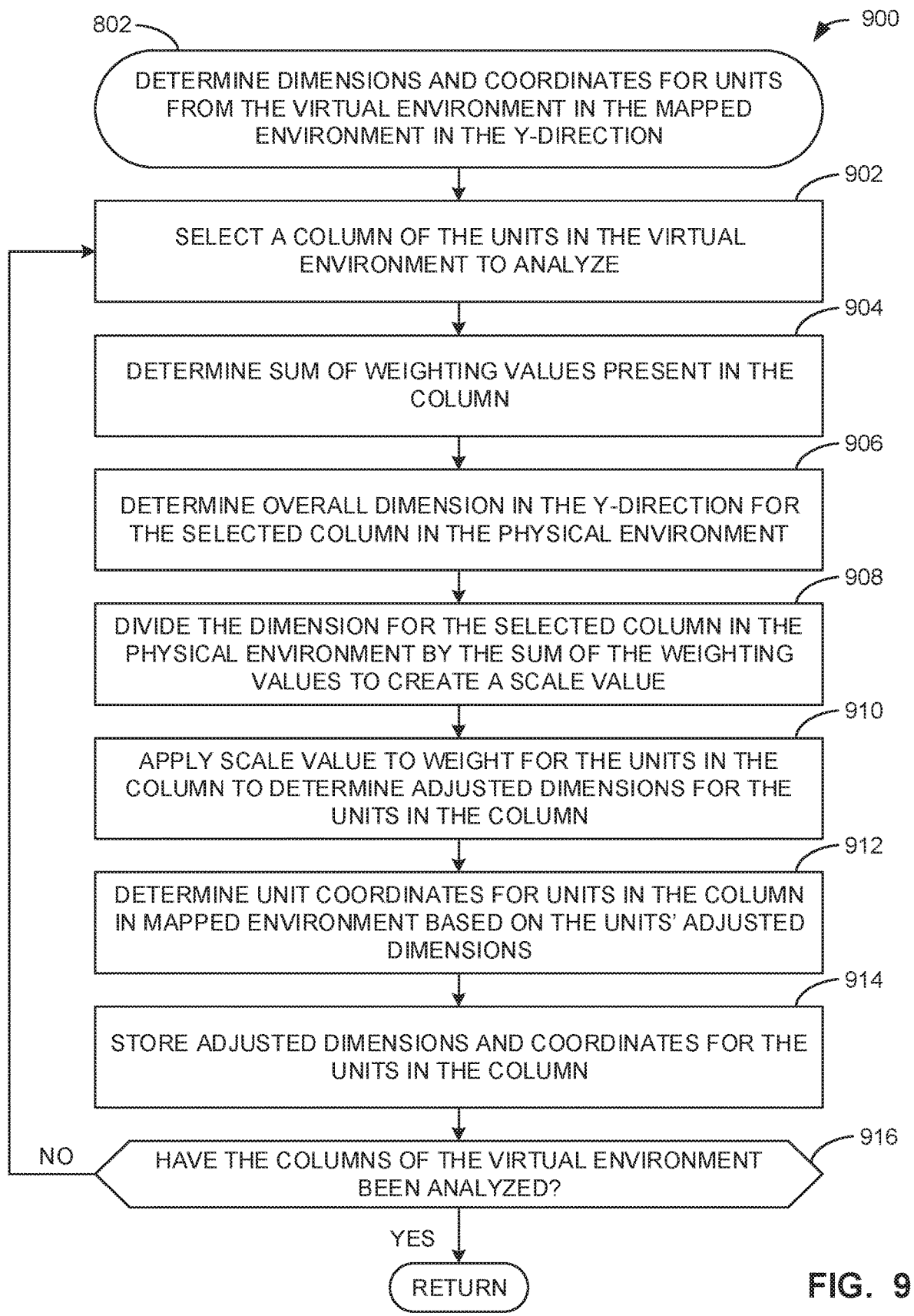
FIG. 9 is a flowchart representative of machine readable instructions that may be used to implement the example virtual environment mapper of FIG. 5 to determine dimensions and coordinates for units from the virtual environment in a first direction.

FIG. 9 is a flowchart representative of machine readable instructions that may be used to implement the example virtual environment mapper of FIG. 5 to determine dimensions and coordinates for units from the virtual environment in a first direction. The example process 900 begins with the virtual environment mapper selecting a column of the units in the virtual environment to analyze (Block 902). In examples disclosed herein, the example mapped environment generator 514 selects a column, (e.g., units aligned vertically in the Y-direction) in the virtual environment, for analysis. The mapped environment generator 504 may select columns for analysis in any order. For example, the mapped environment generator 504 may work its way left-to-right across the X-direction of the virtual environment, analyzing columns in succession. In some examples, wherein alternate unit geometry is utilized (e.g., triangles, trapezoids, etc.), a different method of selecting a group of units for analysis may be used.

The example virtual environment mapper 504 determines the sum of the weighting values present in the column (Block 904). In examples disclosed herein, the example mapped environment generator 514 determines the sum of the weighting values present in the column by adding the weight values previously assigned by the virtual environment analyzer 508 for units in the column.

The example virtual environment mapper 504 determines the overall dimension in the Y-direction for the selected column in the physical environment (Block 906). In examples disclosed herein, the example mapped environment generator 514 determines the overall dimension in the Y-direction for the selected column in the physical environment. The overall dimension may be equal to the Y-direction range of the physical environment. The range refers to the outer (e.g., maximum) dimension of the physical environment. In some examples, the dimension in the Y-direction is calculated or obtained from data received by the physical environment data receiver 508 from the environment sensors 518. In a rectangular physical environment, the dimension in the Y-direction for the selected column is uniform. In some examples, the physical environment may have a nonuniform overall dimension in the Y-direction. In such examples, the dimension may need to be calculated based upon the column's corresponding position in the horizontal direction (e.g., the X-direction) in the physical environment. For example, the first column in the virtual environment corresponds to the first column in the physical environment, and thus the dimension in the Y-direction should be taken at the projected corresponding position of the first column in the physical environment.

The example virtual environment mapper 504 divides the dimension for the selected column in the physical environment by the sum of the weighting values to create a scale value (Block 908). In examples disclosed herein, the example mapped environment generator 514 divides the dimension for the selected column in the Y-direction of the physical environment by the sum of the weighting values to determine a scale value representative of the height of a unit with a weight of one in the mapped environment. The scale value represents the dimension in the Y-direction in the mapped environment of a unit from the virtual environment with a weight of one.

The example virtual environment mapper 504 applies the scale value to the weight for units in the column to determine adjusted dimensions for the units in the column (Block 910). In examples disclosed herein, the mapped environment generator 514 applies the scale value to units to determine an adjusted dimension for units in the column by multiplying the scale value by the weight pertaining the unit under analysis. The adjusted dimensions may be calculated for units in the column in any order. In some examples, adjusted dimensions may be calculated using any method based upon a scale factor and the weight for corresponding to the unit under analysis.

The example virtual environment mapper 504 determines unit coordinates for units in the column in the mapped environment based on the unit' adjusted dimensions (Block 912). In examples disclosed herein, the mapped environment generator 514 calculates values in the Y-direction corresponding to the bounds of a unit in the mapped environment based the unit's adjusted dimension. For example, the first unit (e.g., the lowest unit in the Y-direction) in a column may have a first value in the Y-direction that is zero, since there are no units below this first unit. The second value in the Y-direction, defining the upper bound of this unit in the mapped environment, is determined by adding the adjusted dimension to the first value. The unit coordinates may be determined for the units of the column in any order. The unit coordinates in the mapped environment in the Y-direction may be described in accordance with Equation 3 below.

$$y' = \frac{L}{\sum_{i=1}^{L} f(x, i) * y_i} * \sum_{i=1}^{y} f(x, i) * y_i \qquad \text{Equation 3}$$

In the illustrated example of Equation 3, the variable y' refers to the vertical coordinate in the mapped environment, L refers to the dimension in the Y-direction of the physical environment, f(x,i) refers to the weighting function, $y_i$ refers to the instantaneous position in the vertical direction, and x refers to the position in the horizontal direction. In some examples, the unit coordinates in the mapped environment may depend on additional or alternative factors (e.g., a spacing factor to provide a small separation space between units) or may be calculated using a modified algorithm (e.g., to account for non-rectangular unit geometry).

The example virtual environment mapper 504 stores the adjusted dimension and coordinates for the units in the column (Block 914). In examples disclosed herein, the mapped environment generator 514 stores the adjusted dimensions and coordinates for units in the column for subsequent use by the mapped environment outputter 516. In some examples, the mapped environment generator 514 may only store the coordinates for the units in the column.

The example virtual environment mapper 504 determines if the of the columns of the virtual environment have been analyzed (Block 916). In examples disclosed herein, the example mapped environment generator 514 determines if the columns of the virtual environment have been analyzed and if coordinates have been determined and stored for the columns. In response to the columns of the virtual environment having been analyzed, processing returns to process 800 and proceeds to block 804. Conversely, in response to the columns of the virtual environment not having been analyzed, processing proceeds to block 902, where the example processes of blocks 902 through 914 is repeated.

Figure 10:
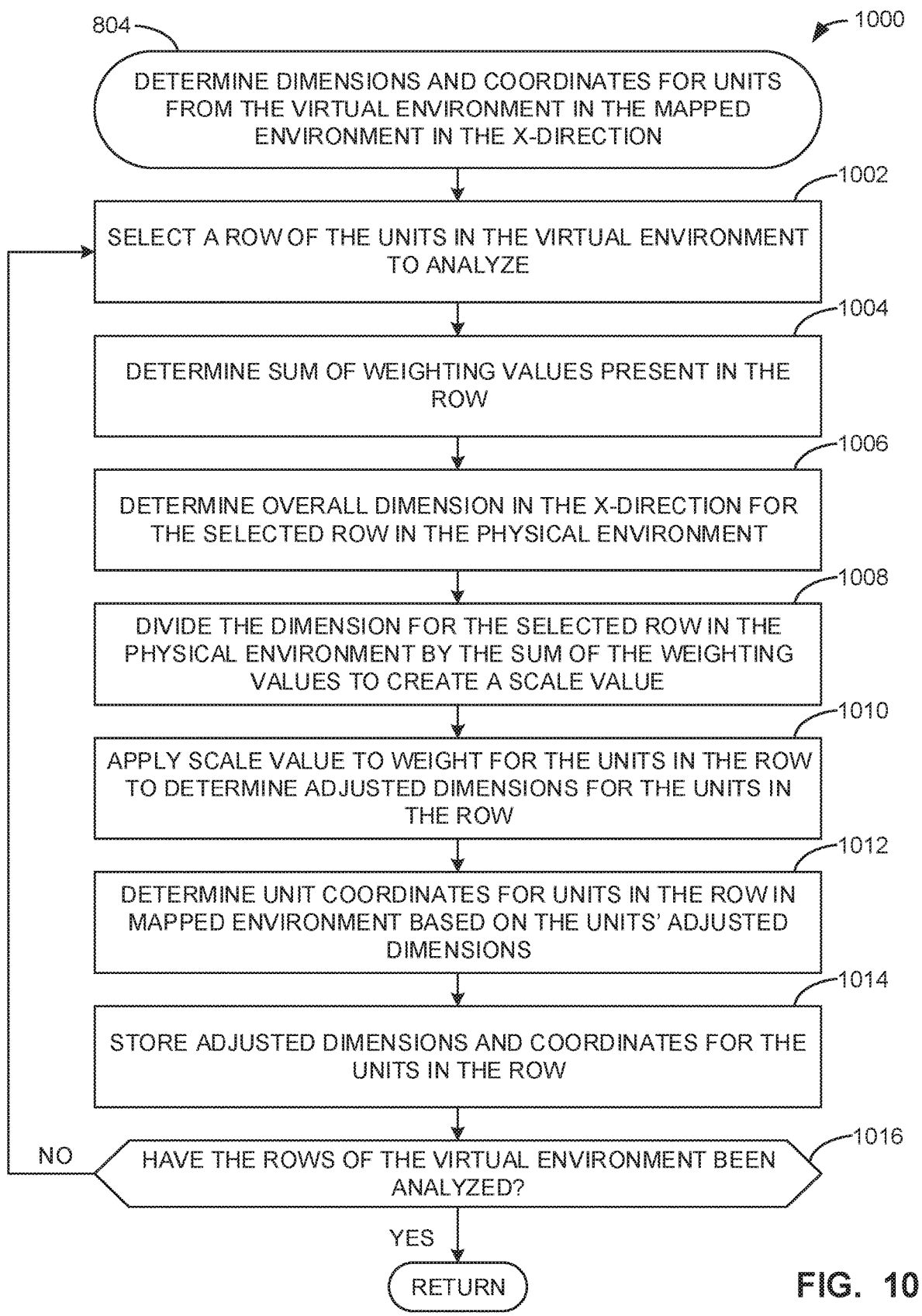
FIG. 10 is a flowchart representative of machine readable instructions that may be used to implement the example virtual environment mapper of FIG. 5 to determine dimensions and coordinates for units from the virtual environment in a second direction.

FIG. 10 is a flowchart representative of machine readable instructions that may be used to implement the example virtual environment mapper of FIG. 5 to determine dimensions and coordinates for units from the virtual environment in a second direction. The example process 1000 begins with the virtual environment mapper selecting a row of the units in the virtual environment to analyze (Block 1002). In examples disclosed herein, the example mapped environment generator 514 selects a row (e.g., units aligned horizontally in the X-direction) in the virtual environment for analysis. The mapped environment generator 504 may select rows for analysis in any order. For example, the mapped environment generator 504 may work its way top-down across the Y-direction of the virtual environment, analyzing rows in succession. In some examples, wherein alternate unit geometry is utilized (e.g., triangles, trapezoids, etc.), a different method of selecting a group of units for analysis may be used.

The example virtual environment mapper 504 determines the sum of the weighting values present in the row (Block 1004). In examples disclosed herein, the example mapped environment generator 514 determines the sum of the weighting values present in the row by adding the weight values previously assigned by the virtual environment analyzer 508 for units in the row.

The example virtual environment mapper 504 determines the overall dimension in the X-direction for the selected row in the physical environment (Block 1006). In examples disclosed herein, the example mapped environment generator 514 determines the dimension in the X-direction for the selected row in the physical environment to be equal to the X-direction range of the physical environment. The range refers to the outer (e.g., maximum) dimension of the physical environment. In some examples, the dimension in the X-direction is calculated or obtained from data received by the physical environment data receiver 508 from the environment sensors 518. In a rectangular physical environment, the dimension in the X-direction for the selected row is uniform. In some examples, the physical environment may have a nonuniform overall dimension in the X-direction. In such examples, the dimension may need to be calculated based upon the row's corresponding position in the vertical direction (e.g., the Y-direction) in the physical environment. For example, the first row in the virtual environment corresponds to the first row in the physical environment, and thus the dimension in the X-direction should be taken at the projected corresponding position of the first row in the physical environment.

The example virtual environment mapper 504 divides the dimension for the selected row in the physical environment by the sum of the weighting values to create a scale value (Block 1008). In examples disclosed herein, the example mapped environment generator 514 divides the dimension for the selected row in the X-direction of the physical environment by the sum of the weighting values to determine a scale value representative of the width of a unit with a weight of one in the mapped environment. The scale value represents the dimension in the X-direction in the mapped environment of a unit from the virtual environment with a weight of one.

The example virtual environment mapper 504 applies the scale value to the weight for units in the row to determine an adjusted dimension for the units in the row (Block 1010). In examples disclosed herein, the mapped environment generator 514 applies the scale value to units to determine an adjusted dimension for the units in the row by multiplying the scale value by the weight pertaining to the unit under analysis. The adjusted dimensions may be calculated for the units in the row in any order. In some examples, the adjusted dimension for the units may be calculated using any method based upon a scale factor and the weight pertaining to the unit under analysis.

The example virtual environment mapper 504 determines unit coordinates in the mapped environment based on the units' adjusted dimensions (Block 1012). In examples disclosed herein, the mapped environment generator 514 calculates values in the X-direction corresponding to the bounds of a unit in the mapped environment based on the unit's adjusted dimension. For example, the first unit (e.g., the first unit in the X-direction) in a row may have a first value in the X-direction that is zero, since there are no units to the left of this first unit. The second value in the X-direction, defining the right-side bound of this unit in the mapped environment, is determined by adding the adjusted dimension to the first value. The unit coordinates may be determined for the units of the row in any order. The unit coordinates in the mapped environment in the X-direction may be described in accordance with Equation 4 below.

$$x' = \frac{W}{\sum_{i=1}^{W} f(i, y) * x_i} * \sum_{i=1}^{x} f(i, y) * x_i \qquad \text{Equation 4}$$

In the illustrated example of Equation 4, the variable x' refers to the horizontal coordinate in the mapped environment, W refers to the dimension in the X-direction of the physical environment, f(i,y) refers to the weighting function, $x_i$ refers to the instantaneous position in the horizontal direction, and y refers to the position in the vertical direction. In some examples, the unit coordinates in the mapped environment may depend on additional or alternative factors (e.g., a spacing factor to provide a small separation space between units) or may be calculated using a modified algorithm (e.g., to account for non-rectangular unit geometry).

The example virtual environment mapper 504 stores the adjusted dimensions and coordinates for the units in the row (Block 1014). In examples disclosed herein, the mapped environment generator 514 stores the adjusted dimension and coordinates for the units in the row for subsequent use by the mapped environment outputter 516. In some examples, the mapped environment generator 514 may only store the coordinates for the units in the row.

The example virtual environment mapper 504 determines if the rows of the virtual environment have been analyzed (Block 1016). In examples disclosed herein, the example mapped environment generator 514 determines if the rows of the virtual environment have been analyzed and if coordinates have been determined and stored for the rows. In response to the rows of the virtual environment having been analyzed, processing returns to process 800 and proceeds to block 806. Conversely, in response to the rows of the virtual environment not having been analyzed, processing proceeds to block 1002, where the example processes of blocks 1002 through 1014 is repeated.

Figure 11:
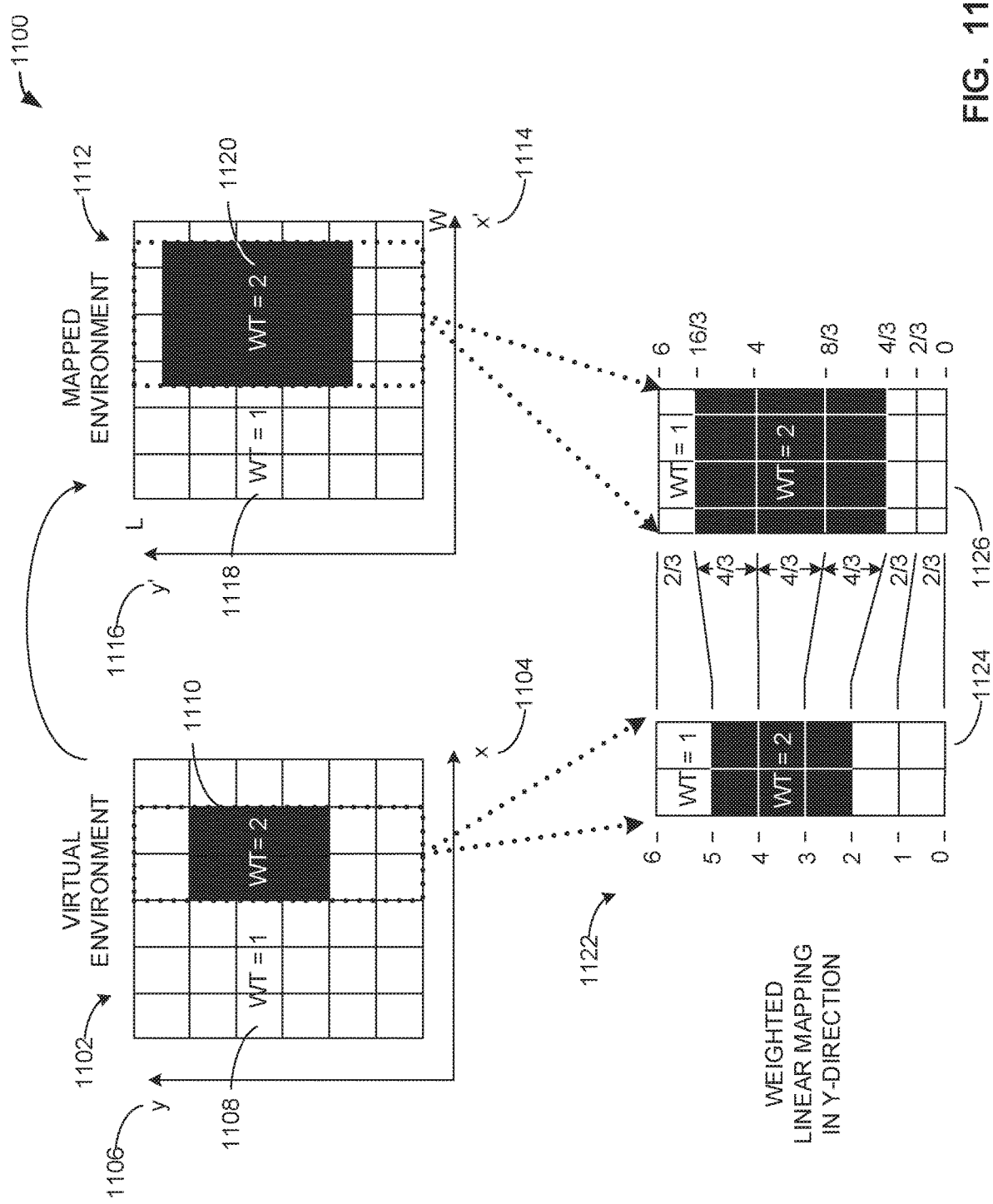
FIG. 11 is a schematic illustration of an example of a virtual environment being mapped in the physical environment by the virtual environment mapper of FIG. 5.

FIG. 11 is a schematic illustration of an example of a virtual environment being mapped in the physical environment by the virtual environment mapper of FIG. 5. The schematic illustration 1100 of FIG. 11 includes a virtual environment 1102 with an X range 1104, a Y range 1106, a lower weighted area 1108, and a higher weighted area 1110. The illustration further includes a mapped environment 1112 corresponding to the virtual environment 1102. The mapped environment 1112 further includes an X' range 1114, a Y' range 1116, a lower weighted area 1118, and a higher weighted area 1120. The schematic 1100 also includes a breakaway schematic 1122 illustrating an example technique of weighted linear mapping in the Y-direction. The breakaway schematic 1122 includes a virtual environment column 1124 and mapped environment column 1126.

The example virtual environment 1102 of the illustrated example of FIG. 11 is the virtual environment included in the VR data received by the virtual environment data receiver 506. The virtual environment 1102 has an X range 1104 spanning the virtual environment 1102 in the horizontal direction and a Y range 1106 spanning the virtual environment 1102 in the vertical direction. In the illustrated example of FIG. 11, the X range 1104 is partitioned into six divisions, with the six divisions of the X range 1104 being one dimensional unit. Similarly, the Y range 1106 is partitioned into six divisions, with the six divisions of the Y range 1106 being one dimensional unit. In some examples, the X range 1104 and the Y range 1106 are partitioned into different numbers of partitions (e.g., the X range 1104 may be partitioned into ten divisions while the Y range 1106 may be partitioned into five divisions, etc.). The virtual environment 1102 includes a lower weighted area 1108 (represented by units with a white background) and a higher weighted area 1110 (represented by units with a black background).

The example mapped environment 1112 of the illustrated example of FIG. 11 is the virtual environment 1102 mapped to a physical environment in accordance with the teachings of this disclosure. The example mapped environment 1112 has the same dimensions as the physical environment. The mapped environment 1112 includes a X' range 1114 spanning the mapped environment 1112 in the horizontal direction and a Y' range 1116 spanning the mapped environment 1112 in the vertical direction. In the illustrated example of FIG. 11, the X' range 1114 has a dimensional value of six, with the six divisions of the X' range 1114 being one dimensional unit. Similarly, the Y' range 1116 has a dimensional value of six, with the six divisions of the Y' range 1116 being one dimensional unit. While the X' range 1114 has an equal dimensional value to the X range 1104 in the illustrated example of FIG. 11, this may not be the case in other examples. Similarly, while the Y' range 1116 has an equal dimensional value to the Y range 1106 in the illustrated example of FIG. 11, this may not be the case in other examples. The mapped environment 1112 additionally includes a lower weighted area 1118, corresponding to the translation of lower weighted area 1108 of the virtual environment 1102 in the mapped environment 1112. The mapped environment 1112 also includes a higher weighted area 1120 (represented by an area with a black background) corresponding to the translation of the higher weighted area 1110 of the virtual environment 1102 in the mapped environment 1112.

The example breakaway schematic 1122 of the illustrated example of FIG. 11 is a representation of the columns corresponding to the higher weighted area 1110 of the virtual environment 1102 and the columns corresponding to the higher weighted area 1120 of the mapped environment 1112 that have been translated to the mapped environment 1112 using weighted linear mapping. Utilizing the techniques described herein for determining dimensions and coordinates for units from the virtual environment in the mapped environment in the Y-direction, as described in accordance with FIG. 11, the overall dimension of the column units in the Y-direction in the illustrated example of FIG. 11 is determined to be six. Further, the sum of the weighting values present in the column is equal to nine. Thus, according to the scale value calculation as described in accordance with FIG. 11, the scale value is two thirds. The adjusted dimension of the units with a weight of one in the mapped environment is therefore equal to two thirds, and the adjusted dimension of the units with a weight of two is therefore equal to four thirds. Performing this same procedure in the X-direction and for every column and row of the virtual environment 1102 results in the mapped environment 1112. As shown in the illustrated example of FIG. 11, the resultant higher weight area 1120 is significantly larger than the lower weight area 1118 relative to the original higher weight area 1110 of the virtual environment 1102 to the lower weight area 1108 of the virtual environment 1102.

Figure 12:
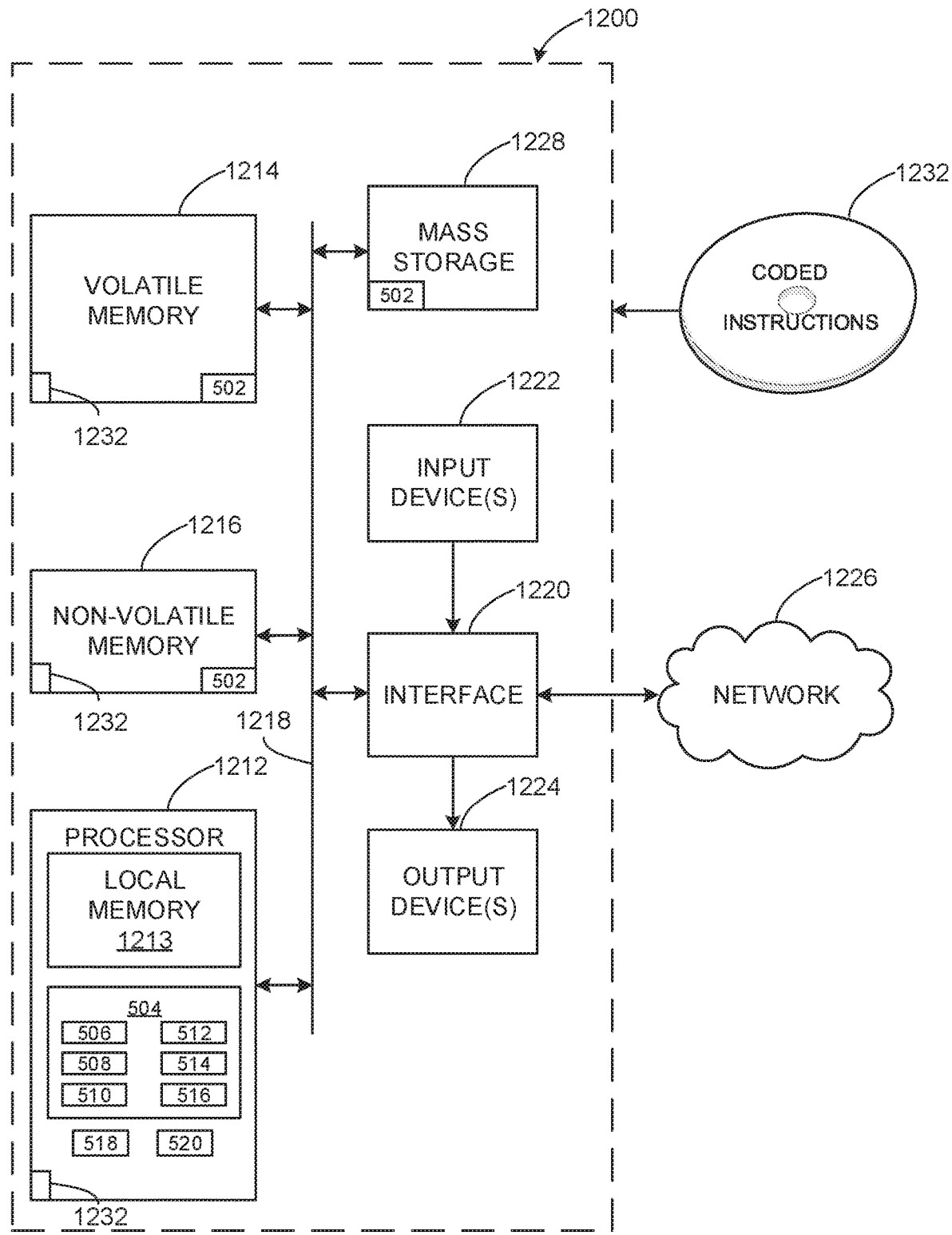
FIG. 12 is a block diagram of an example processing platform that may execute the instructions of FIGS. 6, 7, 8, 9 and/or 10 to implement the virtual environment mapper of FIG. 5.

FIG. 12 is a block diagram of an example processor platform 1200 capable of executing the instructions of FIGS. 6, 7, 8, 9, and/or 10 to implement the virtual environment mapper 504 of FIG. 5. The processor platform 1200 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer. The hardware processor may be a semiconductor based (e.g., silicon based) device. In this example, the processor 1212 implements the example data store 502, the example virtual environment mapper 504, the example virtual environment data receiver 506, the example virtual environment analyzer 508, the example physical environment data receiver 510, the example physical environment analyzer 512, the example mapped environment generator 514, the example mapped environment outputter 516, the example environment sensors 518, the example presenter 520 and/or, more generally, the example virtual reality device 104 of FIG. 5.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAIVIBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a peripheral component interconnect (PCI) express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip, and/or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and DVD drives.

The coded instructions 1232 of FIGS. 6, 7, 8, 9, and/or 10 may be stored in the mass storage device 1228, in the volatile memory 1214, in the non-volatile memory 1216, and/or on a removable non-transitory computer readable storage medium such as a CD or DVD.

From the foregoing, it will be appreciated that example methods, apparatus and articles of manufacture have been disclosed that generate an importance-weighted mapped environment representative of a virtual environment and corresponding to the dimensions of a physical environment. The disclosed methods, apparatus and articles of manufacture provide for a more useful mapped environment wherein important areas are attributed greater weight in the mapped environment and thus given a more useful representation as compared to conventional methods. As a result, the virtual reality device is enhanced by generating a realistic and natural presentation (e.g., due to the proportional representation of the virtual environment in the physical environment) which emphasizes important spaces of the virtual environment.

what is claimed is example 1 includes an apparatus for mapping a virtual environment to a physical environment, the apparatus comprising a virtual environment analyzer to identify a presence of interactive features of an area of the virtual environment based on dimensional data corresponding to the virtual environment, and determine a weight value associated with the area based on an importance of the area, the importance based on the presence of interactive features, a physical environment analyzer to access dimensional data corresponding to the physical environment, and a mapped environment generator to generate a mapped environment based on the dimensional data corresponding to the virtual environment, the dimensional data corresponding to the physical environment, and the presence of interactive features of the area of the virtual environment.

Example 2 includes the apparatus of example 1, wherein the virtual environment analyzer further identifies presences of interactive features of multiple areas and determines weight values associated with the multiple areas based on importances of the multiple areas, the importances of the multiple areas being based on the presences of interactive features of the multiple areas, wherein the mapped environment generator is to allocate space in the mapped environment to areas of the multiple areas based on the weight values associated with the areas.

Example 3 includes the apparatus of example 2, wherein the mapped environment generator further smooths a first weight value for a first area of the multiple areas based on weight values associated with areas surrounding the first area.

Example 4 includes the apparatus of example 3, wherein smoothing the first weight value includes reprocessing the weight value assigned to the area of the virtual environment.

Example 5 includes the apparatus of any one of examples 1-3, wherein the mapped environment generator generates the mapped environment using a weighted linear function associated with the weight value.

Example 6 includes the apparatus of example 1, wherein the mapped environment has an overall dimension based on the dimensional data corresponding to the physical environment.

Example 7 includes the apparatus of example 1, wherein the physical environment analyzer accesses data including data captured by an image sensor.

Example 8 includes the apparatus of example 1, wherein the virtual environment analyzer further determines an amount of interactive features available in the area of the virtual environment, wherein the weight value is further based on the amount of interactive features available in the area of the virtual environment.

Example 9 includes the apparatus of example 1, wherein the weight value is included in a set of possible weight values, the set of possible weight values including multiple corresponding to multiple levels of interactivity.

Example 10 includes the apparatus of example 1, wherein the weight value is further based on a type of the interactive features present in the area.

Example 11 includes the apparatus of example 1, further including a mapped environment outputter to prepare the mapped environment for presentation via a virtual reality presenter example 12 includes at least one non-transitory computer readable storage medium comprising computer readable instructions that, when executed, cause a processor to at least identify a presence of interactive features of an area of a virtual environment based on dimensional data corresponding to the virtual environment, determine a weight value associated with the area based on an importance of the area, the importance based on the presence of interactive features, access dimensional data corresponding to a physical environment, and generate a mapped environment based on the dimensional data corresponding to the virtual environment, the dimensional data corresponding to the physical environment, and the presence of interactive features of the area of the virtual environment.

Example 13 includes the at least one non-transitory computer readable storage medium of example 12, wherein the instructions, when executed, further cause the processor to identify presences of interactive features of multiple areas of the virtual environment and determine weight values associated with the multiple areas based on importances of the multiple areas, the importances of the multiple areas being based on the presences of interactive features of the multiple areas, wherein space in the mapped environment is allocated to areas of the multiple areas based on the weight values associated with the areas.

Example 14 includes the at least one non-transitory computer readable storage medium of example 13, wherein the instructions, when executed, further cause the processor to smooth a first weight value for a first area of the multiple areas based on weight values associated with areas surrounding the first area.

Example 15 includes the at least one non-transitory computer readable storage medium of any one of examples 12-14, wherein the mapped environment is generated using a weighted linear function associated with the weight value.

Example 16 includes the at least one non-transitory computer readable storage medium of example 12, wherein the instructions, when executed, further cause the processor to determine an amount of interactive features in the area of the virtual environment, wherein the weight value is further based on the amount of interactive features available in the area of the virtual environment.

Example 17 includes the at least one non-transitory computer readable storage medium of example 12, wherein the instructions, when executed, further cause the processor to prepare the mapped environment for presentation on or by a virtual reality device display.

Example 18 includes the at least one non-transitory computer readable storage medium of example 12, wherein the area of the virtual environment has a size corresponding to a desired granularity of the mapped environment.

Example 19 includes a method for mapping a virtual environment to a physical environment, the method comprising identifying, by executing an instruction with a processor, a presence of interactive features of an area of a virtual environment based on dimensional data corresponding to the virtual environment, determining, by executing an instruction with the processor, a weight value associated with the area based on an importance of the area, the importance based on the presence of interactive features, accessing, by executing an instruction with the processor, dimensional data corresponding to the physical environment, and generating, by executing an instruction with the processor, a mapped environment based on the dimensional data corresponding to the virtual environment, the dimensional data corresponding to the physical environment, and the presence of interactive features of the area of the virtual environment.

Example 20 includes the method of example 19, further including identifying presences of interactive features of multiple areas of the virtual environment and determining weight values associated with the multiple areas based on importances of the multiple areas, the importances of the multiple areas being based on the presences of interactive features of the multiple areas, wherein space in the mapped environment is allocated to areas of the multiple areas based on the weight values associated with the areas.

Example 21 includes the method of example 20, further including smoothing a first weight value for a first area of the multiple areas based on weight values associated with areas surrounding the first area.

Example 22 includes the method of any one of examples 19-21, wherein the mapped environment is generated using a weighted linear function associated with the weight value.

Example 23 includes the method of example 19, further including determining an amount of interactive features in the area of the virtual environment, wherein the weight value is further based on the amount of interactive features available in the area of the virtual environment.

Example 24 includes the method of example 19, wherein the area of the virtual environment has a size corresponding to a desired granularity of the mapped environment.

Example 25 includes an apparatus for mapping a virtual environment to a physical environment, the apparatus comprising a means for identifying a presence of interactive features of an area of the virtual environment based on dimensional data corresponding to the virtual environment, a means for determining a weight value associated with the area based on an importance of the area, the importance based on the presence of interactive features, a means for accessing dimensional data corresponding to the physical environment, and a means for generating a mapped environment based on the dimensional data corresponding to the virtual environment, the dimensional data corresponding to the physical environment, and the presence of interactive features of the area of the virtual environment.

Example 26 includes the apparatus of example 25, further including a means for identifying presences of interactive features of multiple areas and a means for determining weight values associated with the multiple areas based on importances of the multiple areas, the importances of the multiple areas being based on the presences of interactive features of the multiple areas, wherein the means for generating the mapped environment includes allocating space in the mapped environment to areas of the multiple areas based on the weight values associated with the areas.

Example 27 includes the apparatus of example 26, further including a means for smoothing a first weight value for a first area of the multiple areas based on weight values associated with areas surrounding the first area.

Example 28 includes the apparatus of any one of examples 25-237, wherein the means for generating the mapped environment includes using a weighted linear function associated with the weight value.

Example 29 includes the apparatus of example 25, wherein the means for determining the weight value includes determining an amount of interactive features available in the area of the virtual environment, the weight value being further based on the amount of interactive features available in the area of the virtual environment.

Example 30 includes the apparatus of example 25, further including a means for receiving environment data from sensors, wherein the environment data is used to generate the dimensional data.

Example 31 includes the apparatus of example 25, wherein the area of the virtual environment is included in a set of areas representing the virtual environment, the means for generating the mapped environment being further based on the dimensional data corresponding to the virtual environment, the dimensional data corresponding to the physical environment, and the presences of interactive features of the set of areas.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for mapping a virtual environment to a physical environment, the apparatus comprising:
   a virtual environment analyzer to:
      identify a presence of interactive features of an area of the virtual environment based on dimensional data corresponding to the virtual environment; and
      determine a weight value associated with the area based on an importance of the area, the importance based on the presence of interactive features;
   a physical environment analyzer to access dimensional data corresponding to the physical environment; and
   a mapped environment generator to generate a mapped environment based on the dimensional data corresponding to the virtual environment, the dimensional data corresponding to the physical environment, and the presence of interactive features of the area of the virtual environment.

2. The apparatus of claim 1, wherein the virtual environment analyzer further identifies presences of interactive features of multiple areas and determines weight values associated with the multiple areas based on importances of the multiple areas, the importances of the multiple areas being based on the presences of interactive features of the multiple areas, wherein the mapped environment generator is to allocate space in the mapped environment to areas of the multiple areas based on the weight values associated with the areas.

3. The apparatus of claim 2, wherein the mapped environment generator further smooths a first weight value for a first area of the multiple areas based on weight values associated with areas surrounding the first area.

4. The apparatus of claim 3, wherein smoothing the first weight value includes reprocessing the weight value assigned to the area of the virtual environment.

5. The apparatus of claim 1, wherein the mapped environment generator generates the mapped environment using a weighted linear function associated with the weight value.

6. The apparatus of claim 1, wherein the mapped environment has an overall dimension based on the dimensional data corresponding to the physical environment.

7. The apparatus of claim 1, wherein the physical environment analyzer accesses data including data captured by an image sensor.

8. The apparatus of claim 1, wherein the virtual environment analyzer further determines an amount of interactive features available in the area of the virtual environment, wherein the weight value is further based on the amount of interactive features available in the area of the virtual environment.

9. The apparatus of claim 1, wherein the weight value is included in a set of possible weight values, the set of possible weight values including multiple corresponding to multiple levels of interactivity.

10. The apparatus of claim 1, wherein the weight value is further based on a type of the interactive features present in the area.

11. The apparatus of claim 1, further including a mapped environment outputter to prepare the mapped environment for presentation via a virtual reality presenter.

12. At least one non-transitory computer readable storage medium comprising computer readable instructions that, when executed, cause a processor to at least:
   identify a presence of interactive features of an area of a virtual environment based on dimensional data corresponding to the virtual environment;
   determine a weight value associated with the area based on an importance of the area, the importance based on the presence of interactive features;
   access dimensional data corresponding to a physical environment; and
   generate a mapped environment based on the dimensional data corresponding to the virtual environment, the dimensional data corresponding to the physical environment, and the presence of interactive features of the area of the virtual environment.

13. The at least one non-transitory computer readable storage medium of claim 12, wherein the instructions, when executed, further cause the processor to identify presences of interactive features of multiple areas of the virtual environment and determine weight values associated with the multiple areas based on importances of the multiple areas, the importances of the multiple areas being based on the presences of interactive features of the multiple areas, wherein space in the mapped environment is allocated to areas of the multiple areas based on the weight values associated with the areas.

14. The at least one non-transitory computer readable storage medium of claim 13, wherein the instructions, when executed, further cause the processor to smooth a first weight value for a first area of the multiple areas based on weight values associated with areas surrounding the first area.

15. The at least one non-transitory computer readable storage medium of claim 12, wherein the mapped environment is generated using a weighted linear function associated with the weight value.

16. The at least one non-transitory computer readable storage medium of claim 12, wherein the instructions, when executed, further cause the processor to determine an amount of interactive features in the area of the virtual environment, wherein the weight value is further based on the amount of interactive features available in the area of the virtual environment.

17. The at least one non-transitory computer readable storage medium of claim 12, wherein the instructions, when executed, further cause the processor to prepare the mapped environment for presentation on or by a virtual reality device display.

18. The at least one non-transitory computer readable storage medium of claim 12, wherein the area of the virtual environment has a size corresponding to a desired granularity of the mapped environment.

19. A method for mapping a virtual environment to a physical environment, the method comprising:
   identifying, by executing an instruction with a processor, a presence of interactive features of an area of a virtual environment based on dimensional data corresponding to the virtual environment;
   determining, by executing an instruction with the processor, a weight value associated with the area based on an importance of the area, the importance based on the presence of interactive features;

accessing, by executing an instruction with the processor, dimensional data corresponding to the physical environment; and generating, by executing an instruction with the processor, a mapped environment based on the dimensional data corresponding to the virtual environment, the dimensional data corresponding to the physical environment, and the presence of interactive features of the area of the virtual environment.

20. The method of claim 19, further including identifying presences of interactive features of multiple areas of the virtual environment and determining weight values associated with the multiple areas based on importances of the multiple areas, the importances of the multiple areas being based on the presences of interactive features of the multiple areas, wherein space in the mapped environment is allocated to areas of the multiple areas based on the weight values associated with the areas.

* * * * *